(12) United States Patent
O'Leary et al.

(10) Patent No.: US 10,185,936 B2
(45) Date of Patent: Jan. 22, 2019

(54) METHOD AND SYSTEM FOR PROCESSING INTERNET PAYMENTS

(75) Inventors: Denis O'Leary, New York, NY (US); Vincent D'Agostino, New York, NY (US); S. Richard Re, Westfield, NJ (US); Jessica Burney, New York, NY (US); Adam Hoffman, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 2190 days.

(21) Appl. No.: 09/886,916

(22) Filed: Jun. 21, 2001

(65) Prior Publication Data

US 2002/0077978 A1    Jun. 20, 2002

Related U.S. Application Data

(60) Provisional application No. 60/250,495, filed on Dec. 1, 2000, provisional application No. 60/213,423, filed on Jun. 22, 2000.

(51) Int. Cl.
*G06Q 40/00* (2012.01)
*G06Q 20/04* (2012.01)
*G06Q 20/10* (2012.01)

(52) U.S. Cl.
CPC ............ *G06Q 20/04* (2013.01); *G06Q 20/10* (2013.01); *G06Q 20/102* (2013.01)

(58) Field of Classification Search
USPC ....................................... 705/41, 43, 35–40
See application file for complete search history.

(56) References Cited

U.S. PATENT DOCUMENTS 3,705,385 A    12/1972  Batz
3,860,870 A    1/1975   Furuya
(Continued)

FOREIGN PATENT DOCUMENTS

CA    2430549      6/2002
DE    19731293     1/1999
(Continued)

OTHER PUBLICATIONS

"Information Technologies for the Control of Money Laundering", Sep. 1995.*

(Continued)

*Primary Examiner* — Olabode Akintola
(74) *Attorney, Agent, or Firm* — Hunton Andrews Kurth LLP

(57) ABSTRACT

A system and method for effectuating Electronic Funds Transfer credit messages. The main structural components of the system include a Payment Portal Processor (Web Broker), an Internet Pay Anyone (IPA) Account, a Virtual Private Lockbox (VPL) and an associated Account Reporter, the existing EFT networks, and a cash card for accessing a VPL or IP account. The Web Broker is a software application that provides a secure portal for accessing (linking to) either the user's Demand Deposit Account (DDA) or an IPA account and can be combined with the functionality of a traditional digital Wallet. Consumers use a Web Broker enhanced Wallet to fund their account, shop on the web, pay bills, pay anyone, store electronic receipts and transaction history, and check their recent Web Broker enhanced Wallet activity. The IPA account is a special purpose account with limited functionality for making electronic payments in the form of EFT credit messages. The VPL is a limited function receive only account for receiving electronic payments through the EFT. The Account Reporter is a portal to view (Continued)

transaction history and balance of IPA and VPL accounts, provide online, real-time transaction reports, and to reconciles accounts receivable/purchase records against incoming EFT payment records. A physical card can be associated with either an IPA or VPL account in order to provide PIN debit capability.

92 Claims, 15 Drawing Sheets

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,220,501 A | 6/1993 | Lawlor |
| 5,233,514 A | 8/1993 | Ayyoubi et al. |
| 5,233,654 A | 8/1993 | Harvey et al. |
| 5,235,509 A | 8/1993 | Mueller et al. |
| 5,241,594 A | 8/1993 | Kung |
| 5,262,942 A | 11/1993 | Earle |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,424,938 A | 6/1995 | Wagner et al. |
| 5,426,594 A | 6/1995 | Wright et al. |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,477,040 A | 12/1995 | Lalonde |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,513,117 A | 4/1996 | Small |
| 5,532,920 A | 7/1996 | Hartrick |
| 5,534,855 A | 7/1996 | Gajnak et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,644,778 A | 7/1997 | Burks et al. |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,280 A | 9/1997 | Rosen |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,684,965 A | 11/1997 | Pickering |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,729,693 A | 3/1998 | Holda-Fleck |
| 5,734,838 A | 3/1998 | Robinson |
| 5,737,414 A | 4/1998 | Walker et al. |
| 5,740,231 A | 4/1998 | Cohn et al. |
| 5,761,288 A | 4/1998 | Gray |
| 5,754,840 A | 5/1998 | Rivette |
| 5,757,917 A | 5/1998 | Rose et al. |
| 5,758,126 A | 5/1998 | Daniels et al. |
| 5,758,328 A | 5/1998 | Giovannoli |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |

(56) References Cited

U.S. PATENT DOCUMENTS

| | | |
|---|---|---|
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,793,861 A | 9/1998 | Haigh |
| 5,794,178 A | 9/1998 | Caid |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,003 A | 10/1998 | Jennings et al. |
| 5,825,863 A | 10/1998 | Walker |
| 5,825,870 A | 10/1998 | Miloslavsky |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,089 A | 11/1998 | Kravitz et al. |
| 5,832,211 A | 11/1998 | Blakley, III et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,190 A | 12/1998 | Kleehammer et al. |
| 5,848,400 A | 12/1998 | Chang |
| 5,848,427 A | 12/1998 | Hyodo |
| 5,852,812 A | 12/1998 | Reeder |
| 5,857,023 A | 1/1999 | Demers et al. |
| 5,857,079 A | 1/1999 | Claus et al. |
| 5,862,223 A | 1/1999 | Walker |
| 5,862,323 A | 1/1999 | Blakley, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,724 A | 2/1999 | Lawlor |
| 5,870,725 A | 2/1999 | Belinger et al. |
| 5,870,743 A | 2/1999 | Cohen et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,884,290 A | 3/1999 | Smorodinsky |
| 5,889,862 A | 3/1999 | Ohta et al. |
| 5,889,863 A | 3/1999 | Weber |
| 5,892,900 A | 4/1999 | Ginter et al. |
| 5,895,456 A | 4/1999 | Beale et al. |
| 5,897,621 A | 4/1999 | Boesch et al. |
| 5,897,671 A | 4/1999 | Newman et al. |
| 5,898,780 A | 4/1999 | Liu et al. |
| 5,899,982 A | 5/1999 | Randle |
| 5,902,983 A | 5/1999 | Crevelt et al. |
| 5,903,878 A | 5/1999 | Talati et al. |
| 5,903,880 A | 5/1999 | Biffar |
| 5,903,881 A | 5/1999 | Schrader |
| 5,905,976 A | 5/1999 | Mjolsnes et al. |
| 5,909,486 A | 6/1999 | Walker et al. |
| 5,910,988 A | 6/1999 | Ballard |
| 5,913,202 A | 6/1999 | Motoyama |
| 5,913,203 A | 6/1999 | Wong et al. |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,924,084 A | 7/1999 | De Roojj |
| 5,926,548 A | 7/1999 | Okamoto |
| 5,926,796 A | 7/1999 | Walker et al. |
| 5,926,812 A | 7/1999 | Hilsenrath |
| 5,930,764 A | 7/1999 | Melchione |
| 5,952,639 A | 7/1999 | Ohki |
| 5,933,817 A | 8/1999 | Hucal |
| 5,933,823 A | 8/1999 | Cullen |
| 5,937,394 A | 8/1999 | Wong et al. |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,933,816 A | 9/1999 | Zeanah |
| 5,933,827 A | 9/1999 | Cole |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,641 A | 9/1999 | Korshun |
| 5,953,710 A | 9/1999 | Fleming |
| 5,956,695 A | 9/1999 | Carrithers et al. |
| 5,956,700 A | 9/1999 | Landry |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,647 A | 10/1999 | Downing et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,480 A | 10/1999 | Kalina |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |

(56) References Cited

U.S. PATENT DOCUMENTS

| | | |
|---|---|---|
| 5,991,748 A | 11/1999 | Taskett |
| 5,991,751 A | 11/1999 | Rivette et al. |
| 5,991,780 A | 11/1999 | Rivette |
| 5,995,626 A | 11/1999 | Nishioka et al. |
| 5,995,948 A | 11/1999 | Whitford |
| 5,995,976 A | 11/1999 | Walker et al. |
| 6,003,762 A | 11/1999 | Hayashida |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,133 A | 2/2000 | Hilt et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,073,237 A | 6/2000 | Ellison |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,053 A | 7/2000 | Boesch et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,125,185 A | 9/2000 | Boesch |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,149,055 A | 11/2000 | Gatto ............................ 235/379 |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | Beck et al. |
| 6,173,272 B1 | 1/2001 | Thomas et al. ................. 705/42 |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,189,785 B1 | 2/2001 | Lowery |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,205,433 B1 | 3/2001 | Boesch et al. |
| 6,208,978 B1 | 3/2001 | Walker et al. |
| 6,208,984 B1 | 3/2001 | Rosenthal |
| 6,175,823 B1 | 4/2001 | Van Dusen |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,236,740 B1 * | 5/2001 | Lee .................... G06K 9/00154 382/100 |
| 6,243,688 B1 | 6/2001 | Kalina |
| 6,243,816 B1 | 6/2001 | Fang et al. |
| 6,246,996 B1 | 6/2001 | Stein et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,295,522 B1 | 9/2001 | Boesch |
| 6,298,330 B1 | 10/2001 | Gardenswartz et al. |

(56) References Cited

U.S. PATENT DOCUMENTS

| | | |
|---|---|---|
| 6,298,356 B1 | 10/2001 | Jawahar et al. |
| 6,301,567 B1 | 10/2001 | Leong et al. |
| 6,304,857 B1 | 10/2001 | Heindel et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,321,211 B1 | 11/2001 | Dodd |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditisky et al. |
| 6,336,104 B1 | 1/2002 | Walker et al. |
| 6,339,423 B1 | 1/2002 | Sampson et al. |
| 6,341,724 B2 | 1/2002 | Campisano |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,336 B1 | 2/2002 | Sit et al. |
| 6,360,254 B1 | 3/2002 | Linden et al. |
| 6,363,381 B1 | 3/2002 | Lee et al. |
| 6,366,682 B1 | 4/2002 | Hoffman et al. |
| 6,370,514 B1 | 4/2002 | Messner |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,206 B1 | 6/2002 | Khan et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas, Jr. et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,578,015 B1 | 6/2003 | Haseltine et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,678,664 B1 | 1/2004 | Ganesan |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,704,714 B1 | 3/2004 | O'Leary et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 * | 8/2004 | Magness ............... G06Q 20/10 235/379 |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,691 B1 | 8/2005 | Simpson et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,076,453 B2 | 7/2006 | Jammes et al. |
| 7,080,036 B1 * | 7/2006 | Drummond ............... G06F 8/34 705/41 |
| 7,089,203 B1 | 8/2006 | Crookshanks |
| 7,089,208 B1 * | 8/2006 | Levchin ............... G06Q 20/02 705/39 |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,194,437 B1 | 3/2007 | Britto et al. |

(56) References Cited

U.S. PATENT DOCUMENTS

| | | |
|---|---|---|
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett et al. |
| 7,440,923 B1 | 10/2008 | Compiano |
| 7,644,037 B1 * | 1/2010 | Ostrovsky .............. G06Q 20/04 705/30 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzwer |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023026 A1 | 2/2002 | Carroll et al. |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0082962 A1 | 6/2002 | Farris et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0128968 A1 | 9/2002 | Kitchen et al. |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edward et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0140004 A1 | 7/2003 | O'Leary et al. |
| 2003/0149594 A1 | 8/2003 | Beazley et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0191701 A1 | 10/2003 | Haseltine et al. |
| 2003/0204460 A1 | 10/2003 | Robinson et al. |
| 2003/0216990 A1 | 11/2003 | Star |
| 2004/0031856 A1 | 2/2004 | Atsmon et al. |
| 2004/0049702 A1 | 3/2004 | Subramaniam et al. |
| 2004/0083167 A1 | 4/2004 | Kight et al. |
| 2004/0117409 A1 | 6/2004 | Scahill et al. |
| 2004/0153378 A1 | 8/2004 | Perkowski |
| 2004/0215514 A1 | 10/2004 | Quinlan |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0203844 A1 | 9/2005 | Ferguson et al. |
| 2005/0209965 A1 | 9/2005 | Ganesan |
| 2005/0278641 A1 | 12/2005 | Mansour et al. |
| 2006/0029261 A1 | 2/2006 | Hoffman et al. |
| 2006/0116949 A1 | 6/2006 | Wehunt et al. |
| 2006/0274970 A1 | 12/2006 | Seki et al. |

FOREIGN PATENT DOCUMENTS

| | | |
|---|---|---|
| EP | 0542298 | 5/1993 |
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| FR | 2714749 | 7/1995 |
| JP | 9-504634 | 5/1997 |
| JP | H10-187467 | 7/1998 |
| JP | 11102404 A | 4/1999 |
| JP | 2000-504449 | 4/2000 |
| JP | 2000324329 | 11/2000 |
| JP | 2001134672 | 5/2001 |
| JP | 2005-242976 | 9/2005 |
| WO | WO 95/12859 | 5/1995 |
| WO | WO 96/31965 | 10/1996 |
| WO | WO 97/39415 | 10/1997 |
| WO | WO 97/43736 | 11/1997 |
| WO | WO 98/15925 | 4/1998 |
| WO | WO 98/18095 | 4/1998 |
| WO | WO 99/10823 | 3/1999 |
| WO | WO 99/24921 | 5/1999 |
| WO | WO 99/30263 | 6/1999 |
| WO | WO 99/40507 A1 | 8/1999 |
| WO | WO 99/52051 | 10/1999 |
| WO | WO 00/28462 | 5/2000 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01088659 | 11/2001 |
| WO | WO 02/17082 A1 | 2/2002 |
| WO | WO 2004/079603 | 9/2004 |

OTHER PUBLICATIONS

U.S. Congress, Office of Technology Assessment, "Information Technologies for the Control of Money Laundering," Washingto D.C., Government Printing Office, Sep. 1995.*

(56) References Cited

OTHER PUBLICATIONS

Michele Marrinan, "First Union, Open Market Hit the Internet", Bank Systems & Technology, vol. 32, No. 5, pp. 6,8,10 (1995).
Sumitomo Bank Co., Ltd. Product Brochure Sumitomo's receipt of money verification service (Mar. 1999).
Japanese Office Action dated Aug. 10, 2004.
European Search Report (EP 01 94 6675) dated Jul. 26, 2005.
Kutler, A Different Drummer on the Data Highway, American Banker, Section: No. 91, vol. 160, May 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.

Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun.com, May 32, 1999.
JAVA, JAVA(TM) Servlet API, java.sun.com, May 21, 1999.
Omg, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, Nov. 9, 1994 WSJ B9.
Sirbu, et al, NetBill: An Internet Commerce System Optimized for Network Delivered Services, printed on Feb. 27, 1995.
Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers by Engineers, Thomas Publishing Company, Apr. 26, 1999.

(56) References Cited

OTHER PUBLICATIONS

JAVA, Staying in Touch with JNDI, java.sun.com, May 21, 1999.
Summary of the At Your Request Architecture, First USA Bank Confidential and Proprietary, Apr. 2, 1999, pp. 1-8.
Temporary Global Passwords, IBM Corporation, IBM TDB v36, n3, Mar. 1993, Order 93A 60636, Mar. 1, 1993, pp. 451-454.
JAVA, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
ECharge, eCharge Corporation, www.echarge.com, Dec. 3, 1999.
Cotts, David, The Facility Management Handbook Second Edition AMACM, 1998, ISBN: 0-8144-030-8.
Deckmyn, Dominique, San Francisco manages $45M project via web-based Service, Computerworld, Aug. 9, 1999, vol. 33, No. 32, p. 14.
Frank, John N. Frank, Beyond Direct Mail, Credit Card Management, vol. 9, Iss. 5, Aug. 1996, 4pgs.
Fusaro, Roberta, Builders Moving to Web tools Computerworld, Nov. 16, 1998, vol. 32, No. 46, pp. 51, 53.
Hernandez, Tomas et al., Software Solutions Building Design & Construction, Nov. 1999, vol. 40, No. 11, pp. 38-40.
JAVA™ Servlet API, JAVA, java.sun.com, May 21, 1999, 5 pages.
Larsen, Amy, Internet goes to Work for Builders, InterWeek, Nov. 16, 1998, Issue 741.
Mosig, Richard, Software Review: the Construction Project Manager Cost Engineering, Jan. 1996, vol. 38, No. 1, pp. 7-8.
Owen, David, Facilities Planning & Relocation RSMeans, 1993, ISBN: 0-87629-281-3.
Pletz et al., Summary of the at your risk architecture, Jun. 3, 1999, 8 pages.
Primavera Systems Delivers Expedition Express, Business Wire, Feb. 23, 1999.
Schema for Representing CORBA Objects in an LDAP directory, Sun MicroSystems, Inc., May 21, 1999, 9 pages.
Seibert, Paul, Facilities Planning & Design for Financial Institutions Bankline Publications, 1996, ISBN: 1-55738-780-X.
SmartAxis, Load Cash on to Your E-Purse Card, Supported Currencies and Schemems, http://www.smartaxis.co.uk/seller/howitworks.html, printed Feb. 23, 2001.
SoluSource: For Engineers by Engineers, Thomas Publishing Company, Apr. 26, 1999, 10 pages.
Taylor, Telecommunications Demand Analysis in Transition, Proceedings of the 31st Hawaii International Conference on System Sciences, vol. 5, Jan. 6-9, 1998, pp. 409-415.
Understanding Product Data Management, Hewlett-Packard Company, Apr. 26, 1999, 9 pages.
Welcome to OMG's CORBA for Beginners Page!, OMG, www.omg.com, May 25, 1999, 4 pages.
What is CORBA?, OMG, www.omg.com, May 25, 1999, 2 pages.

\* cited by examiner

METHOD AND SYSTEM FOR PROCESSING INTERNET PAYMENTS

RELATED APPLICATIONS

This application is based on and claims priority to U.S. Provisional Patent Application Nos. 60/213,423, filed Jun. 22, 2000, and 60/250,495, filed Dec. 1, 2000.

FIELD OF THE INVENTION

The present invention generally relates to systems and methods for conducting electronic commerce, and more particularly to systems and method for processing real time payments between consumer accounts.

BACKGROUND OF THE INVENTION

Presently, there are several methods by which a consumer can electronically pay for purchases made on the Internet, such as credit cards, offline debit cards, online debit cards, digital cash, and smart cards. Each of these methods has its own advantages and disadvantages. An off-line debit card uses the traditional credit card system for clearing the payment but no Personal Identification Number (PIN) is required. The use of an on-line debit card requires that the consumer supply his or her PIN, and the amount of the purchase is debited from the consumer's account instantaneously. One disadvantage with both the on and off-line debit cards, from a consumer's point of view, is the inability to reverse or repudiate the transaction. In contrast, by use of a credit card, the consumer at a later date can reverse the transaction (e.g., if the purchased goods are never shipped to the consumer).

It is predicted that credit cards will be the dominant on-line point of sale (POS) payment choice for at least the next five years. While new Internet payment mechanisms have been rapidly emerging, consumers and merchants have been happily conducting a growing volume of commerce using basic credit card functionality. None of the emerging efforts to date have gotten more than a toehold in the market place and momentum continues to build in favor of credit cards.

At the present time, there are several large market segments for an online payment system. First, high volume, low dollar payments from consumers to providers of on-line digital intellectual products or services such as written materials, music, software or games. These can either be 'Intrapreneurs,' individuals or small merchants marketing their products directly to consumers, or larger intermediaries, either traditional retail merchants or auction sites that aggregate consumers and sellers to facilitate sales. A second large market segment involves electronic payments from consumers to other consumers. A third and growing market segment resides in business to business electronic payments.

The market opportunity will continue to explode as what is currently thought of as the Internet continues to expand. In general, the Internet is thought of as Personal Computer (PC) and telephone based. However, that model is quickly changing to include broadband communication via terrestrial links such as Digital Subscriber Line (DSL), wireless and two-way cable. The end number of devices is also expanding to include cellular phones with video displays as well as interactive television, Personal Digital Assistants (PDAs) and kiosks with Internet access. Both of these changes will only serve to increase the number of end points and consumers who will have a need for high-volume, low dollar payment capabilities.

Overall, retail consumer sales as well as business to business sales on the Internet are projected to grow exponentially. The bulk of the payments for these sales are expected to be done with credit cards, which are widely available and owned, are supported by an established infrastructure and provide merchants and consumers with a high degree of surety of payment and receipt. While there are clear differences in the ways in which consumers use credit cards, traditionally, consumers have used them for larger dollar purchases. In recent years, debit cards have entered the market and have been used as cash and check replacements, replacing lower-dollar volume transactions for purchases of consumable products such as food and gasoline.

Debit and credit card transactions are currently processed using the Electronic Funds Transfer EFT network. The debit message comprising the transaction is carried over the EFT network from the point of origination (e.g., a Point of Sale (POS) location, an ATM machine, or an Internet merchant) to the financial institution that issued the card (or its representative). Currently, only debit messages are carried by the EFT network, including debit reversal messages. A debit reversal message reverses a previously processed debit transaction and is generally not considered a credit.

U.S. Pat. No. 5,220,501 to Lawlor, et al., describes a home banking and bill payment system that uses the EFT network. As described in the patent, the systems and methods of Lawlor performs a traditional debit pull from the user's bank account using the EFT network and subsequently makes payments using conventional means such as the ACH network or paper checks. Furthermore, the system of Lawlor uses a centralized computer to which the user attaches via a dedicated phone connection as opposed to connecting through the Internet.

Although credit and debit cards have emerged as the most popular form of payment over the Internet, there are drawbacks associated with each of these payment types. Notably, each have a relatively high cost that includes a processing fee plus a merchant discount of 1.4% and up. The relatively high fees support the credit card business model. While credit and debit cards may continue to be a viable payment option for merchants selling relatively high ticket items over the Internet, credit and debit cards are not economically viable for purchases of lower cost items. For lower-cost items, the relatively high transaction processing fees plus the discount result in the transaction processing fee consuming a relatively high proportion of the total revenue generated by the product sale. These characteristics of a low cost item lend themselves to a low cost payments solution that is guaranteed, yet does not require the payee to bear the burden and risk of authentication.

The Internet is spawning a direct model in which manufacturers of products or services are able to deal directly with consumers. This model has several implications for the payment process. First, by eliminating the middleman, the direct model is resulting in intense price competition, with manufacturers having much tighter margins. This competition creates the need to minimize all costs especially payment processing costs. Second, the Internet enables the development of large numbers of independent producers to 'set up shop' on the Internet and immediately have access to large numbers of consumers. Third, a large and increasing number of intellectual products such as publications, music, video, software, games are more efficiently distributed digitally over the Internet rather than through traditional physical (paper or disc) media. While this trend has already started, as higher bandwidth and increasingly sophisticated devices enter the marketplace, it is expected to increase significantly. Many of these purchases will have the following characteristics: low cost to the consumer and the ability to purchase individual works (i.e.: a song, a video, an article, a game). These characteristics call for a payment form that has a low cost.

By combining these two trends—direct merchant to consumer distribution from independent 'intrapreneurs', and the ability to distribute products digitally—a new marketplace has emerged for low dollar, high volume, real-time payments with payment surety for both consumers and producers. Larger intermediaries, such as existing on-line merchants and auction sites will also benefit from a low-cost payment device for high-volume, low-dollar payments for all of the same reasons outlined above. On-line merchants are currently facing a variety of problems including a low volume of on-line purchases relative to the number of site viewers; a high volume of charge-backs for on-line purchases; non-integrated 'patchwork' systems for payment processing; high fraud rates and high processing fees. All of these factors serve to depress the potential number of customers who are comfortable purchasing on line as well as depressing the profitability of on-line merchants.

Furthermore, to date, there is no efficient way for consumers to make payments to other consumers using the Internet. All traditional forms of person-to-person exchange include the physical exchange of cash or checks rather than a real-time digital exchange of value. In addition, the high cost of retail wire transfers (i.e., Western Union) is cost prohibitive to a significant portion of society.

Automated Clearing House (ACH) payments have begun to be used with respect to payments made via the Internet. These types of transactions typically involve payments made with respect to loans, insurance and utilities. It is predicted that ACH payments will not be widely deployed to on-line POS for two reasons. First, an ACH transaction does not provide transaction authorization, and secondly, authentication requires a preexisting relationship between the customer and the merchant. Furthermore, ACH payments have to be received, deposited and cleared before the funds are available. In contrast to ACH transactions, credit and off-line debit cards require authorization but not authentication. Similarly, on-line debit requires authentication (i.e., a PIN or other authentication). As with credit and debit card transactions, ACH transactions requires that the user provide the merchant (payee) with the "keys" to the user's account. This pull model of effectuating payments again raises the security concerns discussed herein (e.g., fraud).

Two significant drawbacks with some or all of the above models for Internet POS payments are that: 1) a pre-existing relationship between the consumer and the merchant must exist; and 2) the consumer is required to provide the merchant with his or her account and/or PIN. The first drawback of some of the above models cannot be practically overcome as it is impossible for a consumer to have pre-existing relationships with all of the potential merchants conducting business on the Internet. With respect to the provision of the consumer's account and PIN number over the Internet, even though mail order companies have been operating in this manner for years, many consumers feel uneasy about electronically providing their account and PIN numbers to strangers over the Internet.

FIG. 1 depicts the conventional debit/credit transaction model. In this model, if the consumer 100 desires to buy a compact disc (CD) from a web retailer 110, the consumer 100 electronically transmits its debit or credit card number and/or PIN to the web retailer 110. Upon receipt of this information from the consumer 100, the retailer 110 submits the proposed transaction to its bank 120 or merchant acquirer via the EFT system (not shown) for approval. The merchant's bank 120 then contacts the bank 130 (issuer bank) which issued the debit/credit card to the consumer 100. The issuer 130 checks the consumer's balance on the card and either approves or rejects the proposed transaction. This approval or denial is transmitted from the issuer bank 130 back to the merchant bank 120 which then informs the web retailer 110 of the approval or denial. If the charge to the debit/credit card was approved, the transaction is completed by the web retailer 110 shipping the goods to the consumer 100.

Some of the same drawback described above with respect to Internet shopping equally apply to electronic bill payment. The first drawback, requiring a pre-existing relationship between the consumer and bill payee is not as great a concern because this relationship most likely already exists between the consumer and the payee (e.g., the telephone, cable or utility company). The second drawback which requires the consumer to provide the payee with his or her account and/or PIN still remains a concern with electronic bill payment. Although fraud is less of a problem for bill payment, since the consumer presumably has regular dealings with the payee, some consumers still view the provision of the payee with at least his/her account number a diminution in the consumer's privacy.

SUMMARY OF THE INVENTION

The present invention represents a new paradigm for effectuating electronic payments that leverages existing platforms, conventional payment infrastructures and currently available web-based technology to enable e-commerce in both the virtual and physical marketplace. The concept provides a safe, sound, and secure method that allows users (consumers) to shop on the Internet, pay bills, and pay anyone virtually anywhere, all without the consumer having to share account number information with the payee. Merchants receive immediate payment confirmation through the Electronic Funds Transfer (EFT) network so they can ship their product with confidence that the payment has already been received. The present invention further enables small dollar financial transactions, allows for the creation of "web cash" as well as provides facilities for customer service and record-keeping.

The structural components to the system of the present invention include: a Payment Portal Processor, also known as a Web Broker; a digital Wallet; an Internet Pay Anyone (IPA) Account; a Virtual Private Lockbox (VPL); an Account Reporter; the existing EFT networks; and a cash card. The Web Broker is a software application that augments any Internet browser with e-commerce capability. The Web Broker software sits in front of and provides a secure portal for accessing (linking to) the user's Demand Deposit Accounts (DDA) and IPA accounts. The Web Broker enables the user to push electronic credits from its DDA and IPA accounts to any other accounts through the EFT network.

Although the Web Broker can be used as a stand alone product, in a preferred embodiment, the functionality of the Web Broker is directly incorporated into a new form of Web Broker enhanced digital Wallet in order to enhance the consumer's Internet shopping experience. Alternatively, hooks to the Web Broker can be incorporated into existing digital Wallets to add the unique payment feature of the Web Broker. Furthermore, features of online banking (e.g., funds transfers) can be incorporated into the Web Broker to allow for account maintenance and IPA account funding. In association with the traditional Wallet functionality and the Account Reporter of the present invention, the Web Broker is used to fund consumer's accounts, shop on the web, pay bills, pay anyone, store electronic receipts and transaction history, and review the user's recent account and shopping activity. The Web Broker thus provides consumers with a safe, secure, and convenient way to conduct financial transactions over the Internet.

The majority of the prior art electronic Wallets on the Internet today are primarily used as a convenience vehicle, merely providing a method of storing account number information and other form filling functions (e.g., shipping addresses). In contrast to traditional Wallets, the Web Broker enhanced Wallet of the present invention is associated with one or more DDA and/or IPA accounts. The Web Broker thus provides the user with a form of virtual cash that is secure and guaranteed. The Web Broker further contains a receipt feature and archive feature that maintains a transaction history of all payment activity with respect to accounts linked to the Web Broker. The Web Broker further has the capability to store miles, coupons, sweepstakes or other (operated by the user) securely communicates with the IPA account to initiate payments according to the present invention. One essential feature of the present invention, completely contrary to the prior art, is that payments made from the IPA account are transmitted to the payee as a credit over the secure EFT network. As discussed above, only debit related transactions are currently initiated on the EFT system. The EFT credit message of the present invention thus represent a significant advancement in art which has no peers with respect to electronic commerce.

Similar to an IPA, the VPL is a limited function account. While an IPA can be accessed electronically, a VPL is constructed with a "receive only" functionality that enables a merchant (or any party) to receive electronic payments through the EFT. Therefore a VPL is a secure address that can be provided to the public as a means of receiving funds. These funds can then be automatically swept to either the user's corresponding DDA or IPA account, preferably once a day. As will be further described below, there are several types of VPL accounts according to the present invention: one for consumers, one for merchants and one that is initially linked to a cash card as described below. The card VPL is a receive only account that can only be debited via the use of the cash card and a PIN. The consumer and merchant VPLs can similarly be PIN debited to access the funds in the account. Unlike an IPA account, the VPL account cannot be used for initiating EFT credit messages. In one embodiment of the present invention, the IPA and VPL accounts are logically one account with two addresses for account. One address, (the IPA address) is only known to the user (and its issuing institution) and is used to make payments from the account. The other address, the VPL address, is used to receive electronic credits and can be freely published without any fear of fraud.

The Account Reporter is a portal for consumers or business to view the balance and transaction history of an IPA or VPL account. In addition to the features described above intended for use with an IPA account, the Account Reporter includes special functionality intended for use by merchants in association with their VPL accounts. The Account Reporter provides online, real-time transaction reports, and reconciles accounts receivable/purchase records against incoming EFT payment records. In addition, the transaction history of the VPL can be archived and retrieved via a payment search engine in the Account Reporter. This provides the merchant with powerful data mining, customer service, and order fulfillment (warehouse, shipping, supply chain management) tools at their fingertips. Credit card purchases on the web according to prior art methods are not connected to a cash management program. In contrast to these prior art systems, the VPL, connected with the Account Reporter, offers a complete purchasing and cash management opportunity for a merchant. The VPL and Account Reporter combination provides a merchant with instant payment receipt verification, accounts receivable functionality, order fulfillment facilitation, inventory control/supply chain management facilitation and data mining capability.

The Account Reporter is a flexible component offering instant payment confirmation, reconciliation and record retention so that merchants can track purchase orders against actual payments in real time. Every VPL transaction can be stored, searched, and retrieved. This archival/retrieval functionality is the perfect instrument for customer service and data mining. The Account Reporter offers all of the above features, without the need to actively engage in funds management as is required with the prior art.

Using the structures described above, the methods of the present invention allow consumers and businesses to conduct secure and economical shopping on the Internet, to pay anyone online, pay anyone funds online, pay bills electronically online, and even use a linked cash card. The methods and structures of the present invention enable e-commerce in both the virtual and physical marketplace through the use of legacy platforms, the conventional payments infrastructure and currently available web-based technology.

The present invention furthermore solves many, if not all, of the problems of the prior art described above. Currently, all Internet transactions use "pull" technology in which a merchant must receive the consumer's account number (and in some cases PIN number) in order to complete a payment. The payment methods of the present invention conversely use "push" technology in which users (consumers or businesses) push an EFT credit from their IPA or DDA accounts to a merchant's account, without having to provide their own sensitive account information.

The preferred embodiment of the present invention provides an enhanced level of security because sensitive financial information is not carried over the Internet. In this preferred embodiment, all of the financial transactions are executed through the secure EFT network. This preferred method of the present invention provides buyers and sellers with the comfort that their transactions are both secure and private. Furthermore, since payment confirmations are immediately received through the EFT network, sellers can rest assured that the buyer's funds are "good" before the purchase transaction is completed (i.e., before the goods are released (shipped) to the consumer).

Each of the embodiments of the present invention provide significant economic advantages over the prior art systems and methods. The majority of the technology required to implement the present invention already exists, which results in reduced startup costs for an institution practicing the present invention. Payments made according the present methods pass through a mature, established EFT switch which results in a low transaction cost. The payment mechanisms of the prior art are not optimal for processing small dollar transactions. However, the efficient, low cost architecture of the present invention supports payments of any size and is perfect for low dollar purchases. This architecture supports the growing need for Internet micro-payments for goods such as on line articles and music files, yet supports large value payments as well.

By the structures and methods of the present invention, the two most significant disadvantages of the prior art online shopping methods described above have been overcome. First of all, the buyer (consumer or business) is no longer providing its confidential financial information to strangers over the Internet. Rather, the buyer is dealing directly with its own trusted institution (in a preferred embodiment a bank). Furthermore, no preexisting relationship has to exist between the customer and the merchant.

For the merchant, the present invention significantly reduces the transactional cost as compared to the use of credit cards. The method also provides a reduction in fraud and credit losses, while the finality of the transaction virtually eliminates dispute and chargeback processing from the viewpoint of the financial institution. For financial institutions, the present invention all but eliminates the potential of fraud that is inherent with credit card transactions. As consumers are typically only responsible for the first $50 of fraudulent transactions, banks typically absorb the sometimes significant costs associated with fraud. The ability for hackers to steal consumer's account numbers (e.g., credit card numbers) from an Internet merchant is completely eliminated since the merchant never receives such information.

The present invention is not limited to the case of a consumer making purchases from Internet merchants or business to business transactions. The method has further, broader applicability by providing the ability for anyone with an account at an institution to transfer funds to anyone else who also has an account at the same or a different institution. The pay anyone feature of the present invention allows parties to electronically transmit funds instantaneously without the expense of today's wiring fees.

A preferred system for effectuating electronic payments includes at least one account system operated by a first institution, the at least one account system maintaining a plurality of electronic payment accounts for a plurality of customers of a first bank, at least one of the plurality of customers having a demand deposit account at the first bank. The preferred system further includes a bank interface coupled to the at least one account system and coupled to the first bank, the bank interface transmitting and receiving financial information related to the demand deposit account of the at least one customer and related to the electronic payment account of the at least one customer. The preferred system also includes customer interface coupled to the at least one account system, the customer interface providing an interface for the plurality of customers to the at least one account system, the customer interface accepting a command from a first customer to transfer funds from the first customer's electronic payment account to an electronic payment account of another customer, the customer interface transferring the command to the at least one account system which effectuates the commanded transfer of funds.

In a second preferred embodiment, the system for effectuating electronic payments includes an electronic payment account system operated for the benefit of a bank, the account system maintaining a plurality of electronic payment accounts for a plurality of customers of the bank. The second preferred embodiment further includes a bank interface coupled to the electronic payment account system and coupled to a demand deposit account system of the bank, at least one of the plurality of customers having a demand deposit account maintained in the demand deposit account system, the bank interface transmitting and receiving financial information related to the demand deposit account of the at least one customer and related to the electronic payment account of the at least one customer. The second preferred embodiment also includes a customer interface coupled to the account system, the customer interface providing an interface for the plurality of customers to the account system, the customer interface accepting a command from a first customer to transfer funds from the first customer's electronic payment account to an electronic payment account of another customer, the customer interface transferring the command to the at least one account system which effectuates the commanded transfer of funds.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

In contrast to the credit card, on-line and off-line debit and other payment models existing today, one of the unique features of the method of the present invention is the flow of the payment instruction and the payment which follows. In the credit card, on-line and off-line debit models, a buyer provides a seller with an instruction that authorizes the seller to collect funds from the buyer's account. Depending on the system, this debit instruction results in a guaranteed payment in the case of an on-line debit rather than a lengthy wait for funds (such in the case of a check) or something in between in the case of an off-line debit and credit card. The difference between the prior art models and the model of the present invention can be described as the difference between a "pull" and a "push" model. In the conventional models of today, the seller "pulls" the payment from the buyer's account using a debit instruction, while in the present invention the buyer "pushes" an EFT credit to the seller's account.

Figure 1:
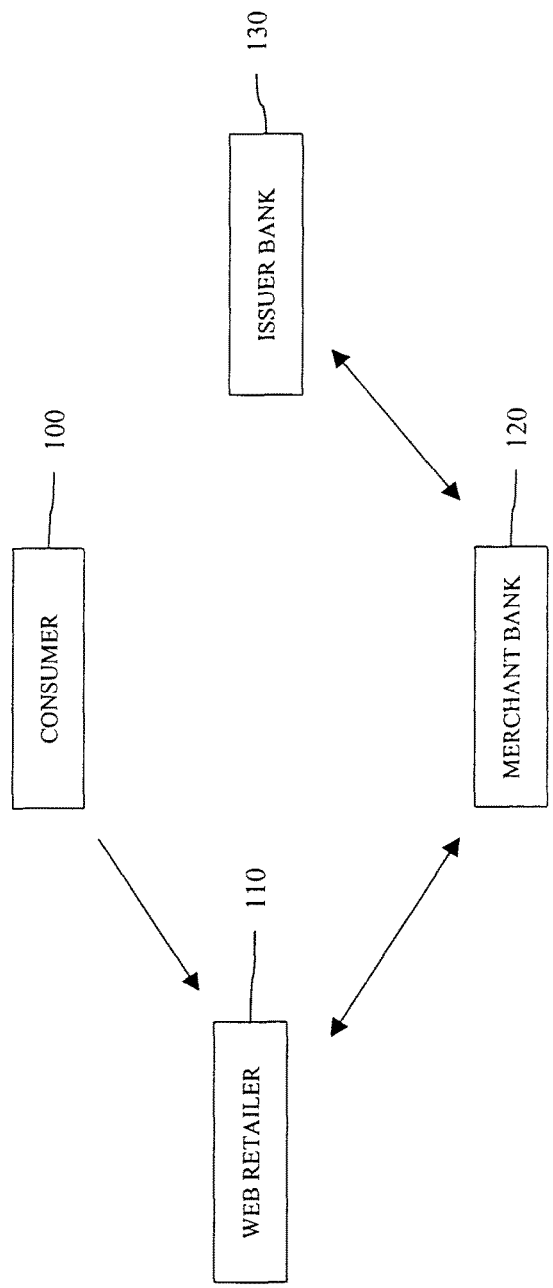
FIG. 1 illustrates the prior art method of Internet payment processing using debit and/or credit cards.
Figure 2:
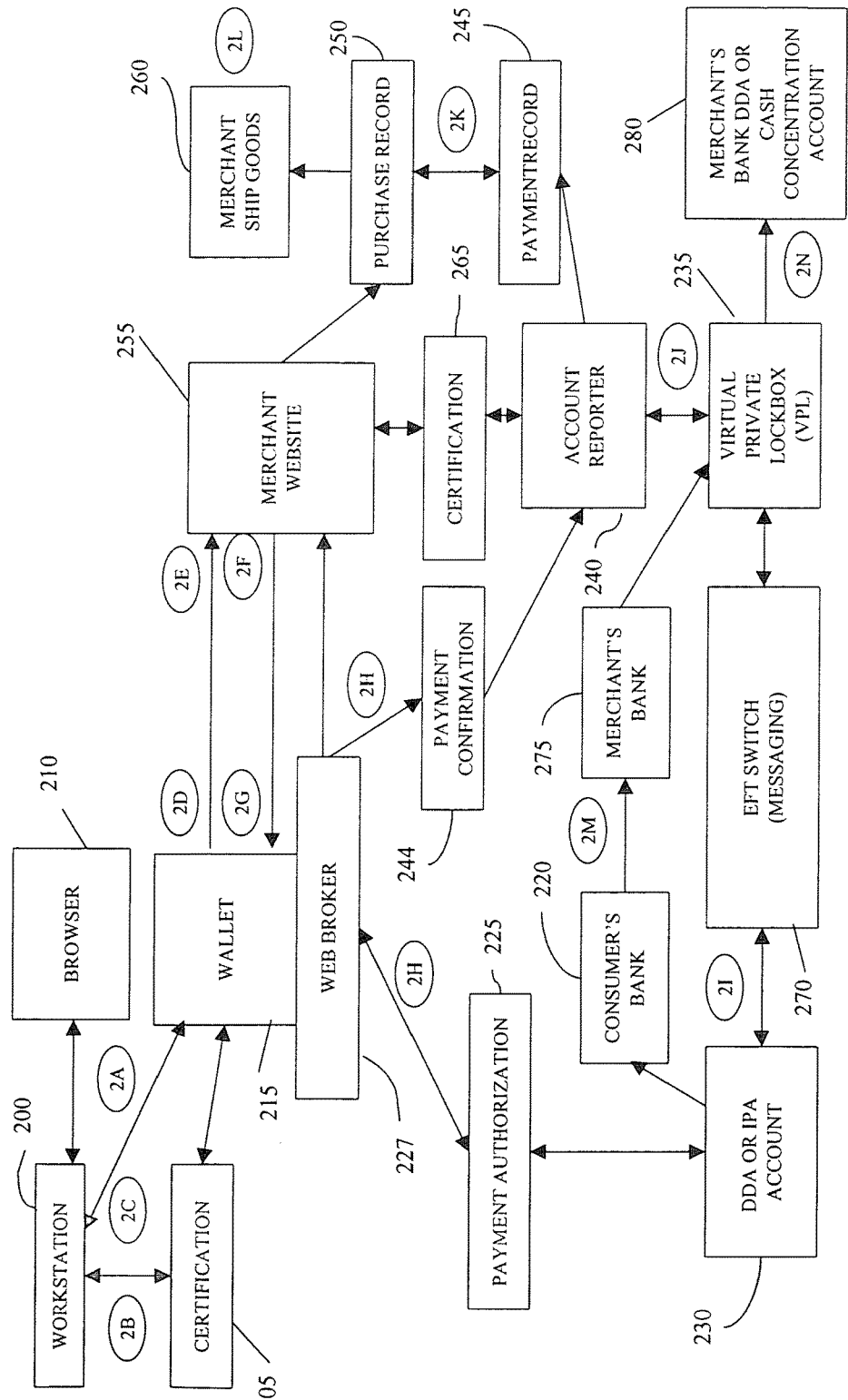
FIG. 2 depicts a first embodiment of the present invention that enables Internet shopping.

FIG. 2 illustrates a first embodiment of the present invention in which a consumer (including businesses acting as consumers) can perform Internet shopping. FIG. 2 further illustrates the main structural components of the present invention. Element 200 represents the device through which the consumer accesses the Internet. In a preferred embodiment, the workstation 200 is a Personal Computer (PC) loaded with an Internet browser 210 such as Netscape™ Navigator™ or Microsoft™ Internet Explorer™. In alternative embodiments, the user can access the Internet using any Internet ready device such as a web enabled ATM machine or a Personal Digital Assistant (PDA) such as a Palm Pilot™, a cell phone or an interactive TV. The present invention is not limited by any particular physical device and can employ any device that provides access to the Internet. For example a public kiosk which provides access to the Internet can be used to practice the present invention. Each of these devices will have at least one processor.

As the user accesses the Internet using its Browser 210, a Wallet 215 is launched by the user. The Wallet 215 can be downloaded and installed from a website. Using thin wallet technology, the majority of software and databases comprising the Wallet 215 resides on a host web server, employing at least one processor, and the user accesses the Wallet 215 through a website or a button (e.g., icon) on the Browser 210. Some functionality of the Wallet 215 can be operated on the workstation 200 itself, without the requirement of attachment to the Internet. In addition to PC-based access as described above, the Wallet 215 can be downloaded to various non-PC devices such as PDAs, cellular telephones, and interactive TV's. The consumer may access the Wallet 215 while logged onto the Internet by selecting a wallet button on the Browser 210 toolbar, or selecting a wallet icon at the merchant's web site. For non-PC devices, the Wallet 215 can be activated via a separate application, a browser link, or through a sponsoring website. In a preferred embodiment of the present invention, a business, such as a bank, operates the server that hosts the Wallet 215 Application Programming Interface (API). This embodiment provides for additional security of the connection between the Wallet 215 and the user's IPA 230 or other accounts maintained at the institution.

FIG. 2 depicts the preferred embodiment of the present invention in which the Wallet 215 incorporates all of the functionality of the Web Broker 227 into a single component. Such a Web Broker enhanced Wallet 215 performs all of the conventional (e.g., form filling) functions of a traditional wallet and further has the payment capability of the Web Broker 227 as described below. As alternatively depicted in FIG. 3 (discussed below) the Wallet 215 can be the conventional form filling wallet with the appropriate interface to the Web Broker 227. In a third embodiment (illustrated in FIG. 5 discussed below), the Wallet 215 is not used at all, and the Web Broker 227 operates as a stand alone component for generating the payment authorization. The following discussion of the Web Broker enhanced Wallet 215, particularly in regard payment functions apply equally to the Web Broker 227 when used as a stand alone component or when used in conjunction with a traditional wallet.

The user's log-in to the Web Broker enhanced Wallet 215 is secure and encrypted to protect the confidentiality of any financial information associated with the operation of the Web Broker enhanced Wallet 215. Once accessed, a window containing the Web Broker enhanced Wallet 215 is launched on the workstation 200 and remains open during the user's session. The Web Broker enhanced Wallet 215 window has the ability to communicate with other open browser windows. In a preferred embodiment, the user's connection to the Web Broker enhanced Wallet 215 is through the Internet. In an alternative embodiment, the connection from the user's workstation 200 to the Web Broker enhanced Wallet 215 software can be through a separate dial up line or third party private network.

As one of its primary functions, the Web Broker enhanced Wallet 215, though the functions provided by the Web Broker 227 serves as the portal to an Internet Payment Account (IPA) or a DDA account 230 described in more detail below. In a preferred embodiment the Web Broker enhanced Wallet 215 stores the following types of information: Form filling information such as credit card numbers, debit card numbers, shipping addresses, alternate shipping addresses, frequent flyer accounts, membership discounts (e.g., AAA, AARP), loyalty programs and e-mail addresses; Discount information such as e-coupons, rebates and merchant-specific spending certificates; Points or miles accrued for use of the accounts associated with the Web Broker 227; and Convenience information such as frequently paid VPL #'s (described below), bill payment account #'s, receipts, e-commerce bookmarks, shopping lists. A preferred download folder is installed on the user's local hard drive. The Web Broker enhanced Wallet 215 has pull down menus that are used to select, edit, update, sort, import and export any of the above information.

Using the above information, the Web Broker enhanced Wallet 215 automatically fills in electronic merchant purchase forms with the user's shipping address, e-mail address, discount numbers, etc. The Web Broker enhanced Wallet 215 supports virtual cash (IPA/DDA) payments in accordance with the present invention, traditional credit and debit card "pull" payments and a combination of the two types of payments as is further described below. Upon receipt of an electronic purchase message from a merchant web site 255 as will be further described below with respect to the method of FIG. 2, the Web Broker enhanced Wallet 215 user is able to: 1) approve a purchase; 2) initiate the payment through a payment authorization to the consumer's bank 220; 3) verify the accuracy of the merchant's payee information (identification of the merchant's account 235 at the merchant's bank 275); 4) generate a purchase confirmation 244 that is transmitted to the merchant web site 255 or VPL reporter 240; and 5) generate a receipt that can be stored at the server hosting the Web Broker enhanced Wallet 215 or the user's storage (e.g., hard drive) on workstation 200. The Web Broker enhanced Wallet 215 user receives a confirmation message indicating that no purchase has been made if a purchase is not completed.

The Web Broker enhanced Wallet 215 includes a "Time Out" feature whereby purchase requests not approved by a user for a set amount of time (e.g. 10 minutes) will be invalidated. For "Pay Anyone" payments as further described with respect to FIG. 3 below, the Web Broker enhanced Wallet 215 is capable of supporting a user defined recission period (e.g., 30 minutes) during which the user can reverse a transaction. In the preferred embodiment, though, the payment is irreversible, thus providing the recipient of the funds (e.g., a merchant) with the confidence that the sender cannot reverse a transaction.

An additional feature of the Web Broker enhanced Wallet 215 are parental control settings. In establishing an IPA account, the user is given the opportunity to establish subordinate (child) IPA and/or VPL accounts that are controlled by the main (parent) IPA account. For example a parent might want to establish an IPA/VPL account for each of its children. Through the IPA account linked to the parent's Web Broker enhanced Wallet 215, the parent is able to view and control all aspects of the children's IPA/VPL accounts. For example, the parent might limit the funding of the children's accounts such that they can only receive funds from the parent's account. This will prohibit strangers from sending money the children's accounts. The parent could also limit the amount or number of any transactions out of the account or limit (block) any payments to unapproved VPL accounts (e.g., associated with unapproved Internet sites)

Using functionality from online banking services, the Web Broker enhanced Wallet 215 is able to be associated with (linked to) some or all of the accounts maintained by the user at the bank 220. The user is thus able to transfer funds, amounts, value, from one account to another (e.g., to an IPA account 230 from a savings account, or VPL account 235) with ease. Although in the preferred embodiment of the present invention, the IPA 230 and VPL accounts are maintained at a financial institution (e.g., a bank), it is readily appreciated that any businesses that can attach to the EFT network 270 are capable of maintaining the accounts 230, 235 and performing the operations of the present invention.

A unique transaction number is included in any payment communications to and from the Web Broker enhanced Wallet 215. All of the payment communications are stored by the Web Broker enhanced Wallet 215 for review and auditing by the user. Examples of stored payment communications include payment messages from a merchant or billers, payment authorizations from the Web Broker enhanced Wallet 215 to the bank 220, and payment confirmations 244 to the merchant (255 or 240). The transaction number for a particular transaction is included in each communication and allows for swift correlation and indexing of communication records (e.g., reconciliation). The Web Broker enhanced Wallet 215 interfaces with the Account Reporter described below, which will have access to all archived transactions. In a preferred embodiment, the payment communication records are stored in a common database and both the Web Broker enhanced Wallet 215 and the Account Reporter associated with (attached to) a particular accounts are able to access the common database for these accounts. Transactions are stored for audit as well as disaster recovery purposes. The Web Broker enhanced Wallet 215 allows the user to view all transaction histories including receipts and messages. These historical items are sortable by date, function (bill payment, pay anyone, shopping, etc.), amount, payments initiated or received, merchant, etc.

As is further described below, the Web Broker enhanced Wallet 215 is responsible for initiating the push of the credit to the merchant's account 235. In order to perform the credit push over the EFT, the Web Broker enhanced Wallet 215 requires the merchant's payee information that uniquely identifies the merchant's Virtual Private Lockbox (VPL) 235. This payee information includes the merchant's bank 275 identification number (typically six digits) and the number of the VPL account 235 (typically ten to thirteen digits). This payee information constitutes an address to which the Wallet 215 can push credits. Payment communications from Web Broker enhanced Wallet 215 can additionally identify the Web Broker enhanced Wallet 215 user's name (if required) and include the unique transaction number. The Web Broker enhanced Wallet 215 can make repeated payments (daily, weekly, etc) as well as scheduled payments (on a specific calendar day or in a specific # of days). If the Web Broker enhanced Wallet 215 is linked to a DDA account, DDA debits such as checks, returned checks, ACH payments, etc. are not charged against funds in the primary IPA account 230 associated with the Web Broker enhanced Wallet 215. Users are required to acknowledge acceptance of a Web Broker enhanced Wallet 215 agreement prior to their first transaction using the Web Broker enhanced Wallet 215 including a requirement to return any proceeds received in error.

Prior to conducting any on-line purchases or making any payments using the methods of the present invention, the consumer establishes an Internet Payment Account (IPA) 230 with its bank 220. Alternatively, a DDA account 230 can be used, but this is less preferable. For one reason, it is envisioned that only small payments are to be made from the IPA account 230 and accordingly less funds would be kept in the account as opposed to the funds normally maintained in a DDA account.

The IPA account 230 is a specialized account used specifically for electronic commerce in accordance with the present invention. Once the IPA account 230 has been established, the user is able to fund this account 230 from its normal DDA checking or savings accounts, consumer's Line of Credit, or credit, or debit card account held by the bank 220 or any other account from which the consumer can transfer funds (e.g., another DDA account or credit card account at another financial institution). The IPA account 230 provides the user with a confirmation capability in order to verify that the amount drawn is correct. The IPA account 230 and the VPL account 235 (described below) both allow PIN debit transactions for withdrawals from the accounts.

In a preferred embodiment, the IPA account 230 is combined with a VPL account 235 into a single account. The IPA account functionality is accessed through a first address to the account by which funds can be transferred out of the IPA account. Only the user has access to this address and it is password and or PIN protected. If the user has several IPA accounts, when the user accesses its Web Broker 227, a single password and or PIN procedure provides access to all of the user's accounts. The VPL functionality makes the single account appear as a receive only account and is accordingly accessed through a second, preferably different address. This second address can only be used for receipt of credits, preferably electronic credits according to the present invention. Since the second address can only be used to receive funds, the user can freely publish the address without any fear of someone fraudulently transferring money out of the account. The VPL portion of the account can be accessed for PIN debit transactions as will be further described below in connection with the physical card embodiment of the present invention (see FIG. 4)

The establishment of a separate IPA/VPL account 230 for electronic credits and payments is preferable from a user's point of view in order to provide a separate accounting from the user's normal DDA. As with its regular accounts, a transaction history for the IPA 230 is archived. As the IPA account 230 is not necessarily interest bearing, it is envisioned that the user would accordingly only fund small amounts into this account in order to cover potential on-line purchases. The user can set up periodic (e.g., weekly)

automatic funding of the IPA account 230. In an alternative embodiment of the present invention, the user's payments in accordance with the present invention may be made directly against a normal DDA account.

The IPA 230 or VPL 235 accounts can have physical companion card for physical, in person, purchases and withdrawals as will be further described below with respect to FIG. 4. Each of the IPA 230 and VPL 235 accounts allow physical access via ATM's or merchant card readers for PIN debit transactions.

One of the most significant features of the present invention is the use of the existing EFT networks 270. Although these networks 270 have provided secure transfer of funds for years, the use of these networks in accordance with the present invention is heretofore unheard of. In the use of the EFT network, the present invention provides real time credit. This is contrasted to the prior art debit message methods in which the only semblance of credit provided in a reversal of a prior debit transaction (e.g., credit cards). The EFT networks 270 are used to effect IPA transactions, fulfill IPA reporting functionality, and can be used to fund the IPA 230. As well as supporting the transmission of real time credit messages, the EFT network 270 transmits messages containing special transaction codes and account and bank number structures (addresses) used to uniquely identify IPA transactions. Furthermore, the EFT network 270 can be used to verify the existence and validity of destination accounts as further described below.

As described above, similar to an IPA account 230, the Virtual Personal Lockbox (VPL) 235 is a limited function account. While an IPA 230 can be accessed electronically for outgoing payment transactions, a VPL 230 is constructed with EFT network "receive only" functionality. This feature of a VPL account (or a VPL address for a dual access IPA/VPL account) provides a merchant (or other party) to receive electronic credits (e.g., payments) through the EFT 270. In this manner a VPL 235 is a secure address that can be provided to the public as a means of receiving funds. Once received by a VPL account 235, funds can then be manually or automatically swept by the merchant's bank 275 to one of the owner's other accounts 280 (e.g., a DDA or cash concentration account 280). This sweep can be performed once a day, or more or less than once a day as dictated by the needs and objectives of the VPL user.

Like an IPA account 230, the VPL 235 can have a physical companion card for physical, in person, purchases and withdrawals. The VPL 235 can allow physical access via ATM's or merchant card readers for a PIN debit transaction using a user only access (address) for debit transactions from the VPL 235. Although providing the general function of an account (to hold funds), it must be repeated that the basic functionality of a VPL 235 is distinct from the IPA account 230 functionality. The VPL 235 is a secure lockbox into which funds can be transferred but cannot be taken out (except during the sweeping process or other PIN transactions described herein).

Figure 3:
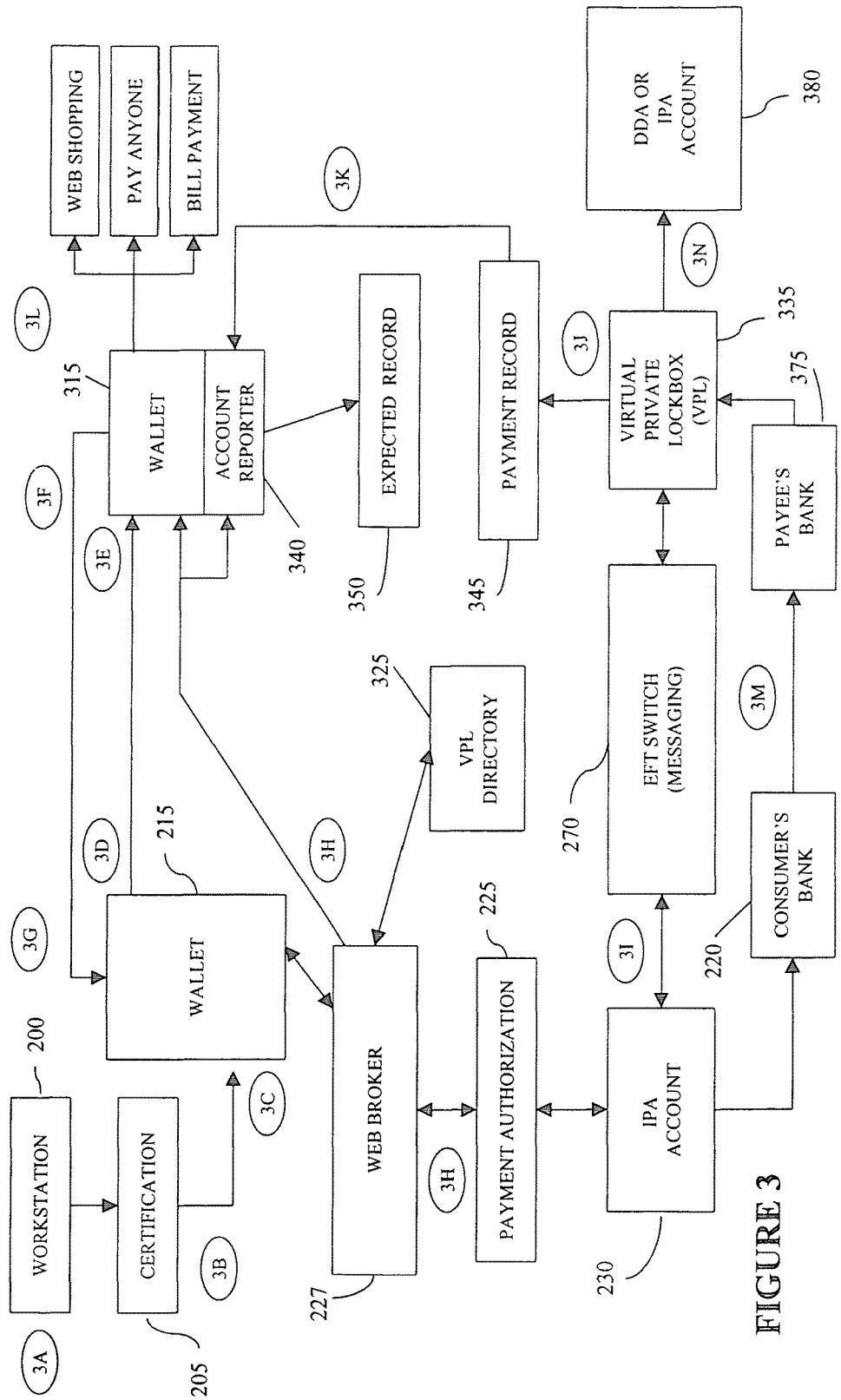
FIG. 3 depicts a pay anyone embodiment of the present invention.

In preferred embodiment of the present invention, VPL addresses for various merchants and other receivers of electronic payments are made available in a public directory 325 (see FIG. 3). Since the 'receive only' address of a VPL account 235 is what is published in the public directory, merchants and other users of the 'receive only' VPL 235 are alleviated of the fear of the fraud. In the preferred embodiment, the directory of VPL addresses 325 is maintained on an Internet accessible server or servers and accessed through a website that provides the capability to search and select and retrieve VPL information. Alternatively, the directory 325 can be accessed by PDA, kiosk or by phone using voice recognition or other telephony technology. The directory 325 can be used by the Web Broker enhanced Wallet 215 to verify the accuracy of a VPL address before it commits to transferring a credit message to the account designated in the VPL address.

As described above, the address for an IPA 230 or VPL 235 consists of an identification of the institution at which the account is held (typically six digits) and an identification of the account (typically ten to thirteen digits). For consumers (the "white pages"), the directory 325 contains but is not limited to the VPL address, the last and first name of the VPL consumer, the user's Post Office address, phone and email address. For businesses (the "yellow pages"), the directory 325 contains but is not limited to the VPL address, the business name, the industry or type of business, the business' Post Office address, phone and email address.

As briefly described above, the Account Reporter 240 is a portal to view the VPL account 235. The Account Reporter 240 provides online, real-time transaction reports, and reconciles accounts receivable/purchase records 250 against incoming EFT payment records 245. Although primarily intended for use by merchants, much of the functionality of the Account Reporter 240 is incorporated in the Web Broker 227 Wallet 215. The Web Broker 227 preferably include a base set of requirements for consumers, and the Account Reporter 245 would contain added features required for merchants and businesses (e.g., reconciliation of purchase records and payment records).

The VPL account 235 updates the Account Reporter 240 as payment records (credit messages) and transaction numbers are received through the EFT messaging system 270. At the same time, any purchase orders 250 (in the form of a record) and payment confirmations (see below) are passed to the Account Reporter 240 from merchant and billing web sites. As seen in FIG. 2, the Account Reporter 240 is also capable of receiving purchase confirmations 244 from the Web Broker 227. Purchase confirmations 244 and payment records 245 are retrievable, in real-time, from the Account Reporter 240. Account Reporter 240 users are able to view their records with respect to their VPL accounts 235 on the Internet. Although only one VPL account 235 has been illustrated in FIG. 2, it is understood that a merchant is able to simultaneously maintain several VPLs 235. Each of these VPLs 235 is capable of being accessed and viewed by the single Account Reporter 240, much like a consumer is able to associate several IPA/VPL accounts with its Web Broker 227 and is able to view these accounts using the Web Broker 227.

In addition to the functionality described above with respect to the base features of the Account Reporter 240 (storing, reviewing, sorting transaction histories), a merchant embodiment of Account Reporter 240 includes additional functionality. A first of the additional functions provided by the merchant Account Reporter 240 is its reconciling capability that matches purchase requests 250 generated by the merchant's website 255 with shopper's purchase confirmations 244 and the EFT payment records 245. Any items that do not match are flagged by the Account Reporter 240 as exceptions for review. The merchant Account Reporter 240 further provides for identification (ID) and password security, offering varying levels of access authority to the users.

Additionally, the merchant Account Reporter 240 automatically updates the merchant's accounts receivable, inventory & fulfillment files. As a further extension, Account Reporter 240 also has fulfillment service capabilities whereby information from a merchant's website 255 is consolidated and communicated to a warehouse to initiate product shipment 260, as well as linked to United Parcel Service (UPS™), Federal Express (FedEx™), or other shipping services for shipping execution. The Account Reporter 240 contains essential customer service tools such as the ability retrieve/review electronic purchase orders/payments real time, and in turn the ability to email or autofax copies of such directly to customers. The Account Reporter 240 further provides data mining tools that collect statistics on buyer/shopper behavior, track seasonal and regional buyer/shopper trends, and track other key demographics. Based on these statistics, merchants can issue focused, customized electronic coupons through their Account Reporter 240.

In one embodiment of the present invention, the user of an IPA account 230 can specify whether or not the credits it pushes from the IPA includes any identification information at all (e.g., account number, name . . . ) One of the features of the electronic credit pushes of the present invention is that the credit pushes can be made completely anonymously, with the recipient of the credit having no way to determine from where the credit originated. The recipient of the credit is able to match the received credit with a proposed purchase using a transaction ID that is contained in the EFT credit push. In the Internet shopping embodiment described below, the Internet merchant provides the buyer with the transaction ID and the buyer includes the transaction ID in the EFT credit message sent to the Internet Merchant's VPL account.

If the user is less concerned with privacy, the user can include a partial or complete identification of itself in the credit push. If the credit push received by a VPL 235 does contain some identification information, the Account Reporter 240 can be configured such that the identities of individual buyers will not be available to the Account Reporter 240 without the prior consent of the user who initiated the credit to the VPL 235. For consumers, the Account Reporter 240 appears as a seamless part of the Web Broker 227, while for merchants and businesses, the Account Reporter 240 appears as a separate utility.

Merchant Web sites 255 are well known to those skilled in the art. Merchant Web sites 255 typically include code (such as HTML, XML, or ECML) for getting transaction BIN statements (payment messages) to the Wallet 215. As further described below these payment messages typically contain the merchant's VPL 235 address which includes the address of the merchant's bank 275. The payment messages enable the consumer to push a credit from its IPA account 230 through the EFT system 270 to the VPL account 235. Merchant's websites 255 can provide a hotlink on the shopping site 255 that goes directly to shopper's Web Broker enhanced Wallet 215.

Having described the structural elements of the present invention, the following discussion illustrates an embodiment of the present invention related to Internet shopping. As in all of the remaining FIGS. 2-9, the method steps are illustrated in the Figures in small circles next to the structural element most closely related to the action being performed. In this embodiment, the consumer (user) initiates the process in step 2A by logging onto the Internet, launching the Browser 210 and selecting the Web Broker enhanced Wallet 215 icon from Browser 210 toolbar. The Web Broker enhanced Wallet 215 does not have to activated until the user actually wishes to buy something, but the Web Broker enhanced Wallet 215 could also contain lists of links to a user's favorite shopping sites (or billing sites as is further described below).

In step 2B, the user completes a certification procedure 205 in order to correctly identify him or herself to the Web Broker enhanced Wallet 215. Typically the certification process involved the user keying in the user's ID and password on the keyboard associated with the workstation 200. The user is thus authenticated and has access to their Web Broker enhanced Wallet 215. In step 2C, the user is then presented with balance information with respect the IPA accounts 230 associated with the Web Broker enhanced Wallet 215 and can select from several options. In a preferred embodiment the options presented to the user include: Shop on the Web; Pay Anyone (see FIGS. 3 and 5); Fund Accounts (see FIG. 9); Pay Bills (see FIGS. 6-8); and View Account Activity.

Assuming the user has selected the Shop on the Web option in step 2D, the Browser 210 could be initially directed to special website list of approved merchants (which can also contain the VPL addresses for such merchants). Alternatively, the user is free to navigate the Internet to the merchant web site of their choice. In step 2E, the user has found a website 255 of a particular merchant and more specifically has found and selected an item for purchase from merchant web site 255. Since the Web Broker enhanced Wallet 215 is active, the merchant's site 255 recognizes user as a Web Broker enhanced Wallet 215 customer. In response to this recognition, all of the purchase fields (shipping address, name, etc.) required by the merchant site 255 are automatically populated from the Web Broker enhanced Wallet 215 as described above. Alternatively, the user can sign on to their Web Broker enhanced Wallet 215 after the user has found an item at a website for purchase. The user can either invoke the Web Broker enhanced Wallet 215 by clicking on an icon embedded directly into the merchant's web page 255, or by clicking on a wallet button on the Browser 210 toolbar.

In step 2F, the merchant site 255 generates and transmits to the user a bill payment message containing information with respect to the prospective purchase. The information provided by the website 255 in the bill payment message includes but is not limited to the following data: Merchant BIN; Merchant Account #; Transaction ID; and the Dollar Amount of the transaction. In step 2G the bill payment message is received by the Wallet 215 window. A window displays the bill payment message for review by the user. If the user changes his or her mind, the user can select a button on the window entitled Decline Purchase. If the user does want to complete the purchase, a Purchase Item button is selected. Although described above with respect to a single item, it is clear that the above process equally applies the shopping cart method employed by most merchant sites 255. In the shopping cart method, after the customer has selected a number of items to purchase, the merchant site 255 totals the items and transmits a consolidated payment message to the Web Broker enhanced Wallet 215 in step 2F.

If the user has selected to purchase the item pursuant to the bill payment message from the merchant site 255, the Web Broker portion 227 of the Web Broker enhanced Wallet 215 in step 2H first verifies the user's balance in the primary IPA account 230 associated with the Web Broker enhanced Wallet 215. If there are insufficient funds in the IPA account 230, the user is asked if he/she would like to transfer funds from another account into the IPA account. Using online banking procedures, the Web Broker enhanced Wallet 215 is able to transfer funds from any account accessible by the Web Broker enhanced Wallet 215 into the IPA account 230. If there are sufficient funds in the IPA account 235, the Web Broker 227 generates a payment authorization message for transmission to the bank 220. The payment authorization message 225 contains the above described payee information (merchant VPL account and bank address) and can also contain a user defined memo field for entry of any information desired by the user (e.g., "payment for new mystery book").

In addition to generating and transmitting the payment authorization 225, the Web Broker 227 transmits a purchase acknowledgement directly to the merchant's website 255. Typically, in response to this purchase acknowledgement from the user's Web Broker 227, the merchant's website 255 creates a purchase record 250 in a database (not shown) for future use in reconciling with the actual payment confirmation 244 and/or payment record 245. As illustrated in FIG. 2, the Web Broker 227 also send a payment confirmation 244 either to the website 255, or the merchant's Account Reporter 240. In the preferred embodiment, the payment confirmation 244 is in the form of an electronic message (e.g., an E-mail) to the Account Reporter 240. The payment confirmation 244 can be sent either before or after the Web Broker 227 has actually transmitted the payment authorization 225 to its bank 220, without any confirmation from the bank 220 that the payment was actually transmitted via the EFT network 270. Alternatively, the Web Broker 227 can wait until it has received confirmation from the bank 220 that the EFT credit message was actually sent through the EFT network 270.

In the preferred embodiment the banks 220, 275 which maintain IPA 230 and VPL accounts 235 also maintain the above described database that is used as a centralized record keeping archive in order to feed and retrieve transaction data. Such transaction data includes but is not limited to payment authorizations 225, payment confirmations, and the records required for the Account Reporter 240 including EFT transaction data.

In addition to the payment acknowledgment sent to the merchant's website 255, and the payment confirmation sent to the Account Reporter 240, the Web Broker 227 transmits the payment authorization 225 to the user's IPA account 230 to effectuate the actual transference of the funds from the user's account 230 to the merchant's account 235 via an EFT credit message on the EFT system 270. The consumer's bank 220 will require some form of authentication of the payment authorization from the Web Broker 227. This authentication can be in the form of a software certification, an encrypted PIN, or the mother's maiden name of the consumer. Once the bank 220 has authenticated that the message truly originated from the consumer, the bank 220 can then fulfill the payment authorization 225.

Upon receipt of this authorization for payment 225, in step 2I, the user's bank 220 debits the user's IPA account 230 to generate an EFT credit message in the amount of the authorized payment. As described above, the EFT credit message is completely different from traditional EFT messages that are debits or the reversals of debits. Once generated, the EFT credit message is transferred to the merchant's VPL account 235 via the ATM switch 270. Although the credit instruction is illustrated in FIG. 2 as being processed directly by the accounts 230 and 235, it is appreciated that the records are actually processed by the messaging systems and processors of the user's bank 220, the merchant's bank 275 and the EFT network 270. The EFT credit message is essentially a guarantee of payment from the user's bank 220 (the finds being debited from the user's account 230) to the merchant's bank 275 (the funds being credited to the merchant's account 235). Settlement between banks 220 and 275 typically occurs once a day with respect to all outstanding credits and debits between the banks 220, 275, although the cash is available from the VPL account 235 upon receipt of the EFT credit message.

After the EFT credit message has been received by merchant's VPL 235, the receipt of the credit is detected by the merchant's Account Reporter 245 (step 2J). In response to the detection of the credit, the Account Reporter 240 preferably generates and stores a payment record 245 in the same database in which the purchase record 250 was stored in step 2H described above. Although only a single payment record 245 has been illustrated in FIG. 2, it is appreciated that two payment records 245 can exist for a single payment transaction. The first payment record 245 can be generated upon the receipt of the payment confirmation 244 from the user's Web Broker 227. The second payment record 245 can be generated upon the actual receipt of the EFT credit over the EFT system 270.

Once the payment record 245 has been stored, it can be reconciled by the Account Reporter 240 against the merchant's purchase record 250 (step 2K). In this manner, the accounting loop in the merchant's system can be closed, with the matching of the merchant's invoice (the purchase record 250) with the payment (the payment record 245). Alternatively, the Account Reporter 240 can reconcile the above described two payment records (one generated from the payment confirmation and one generated from the EFT credit message) against the purchase record 250. With Account Reporter 240, a merchant has a product that allows for secure transaction fulfillment, reconcilement ability, record-keeping and archive possibilities. Once the financial loop has been closed with the receipt of the payment record 245 by the merchant, the merchant can confidently ship the goods 260 to the consumer in step 2L. Shipment of the goods can entail physical shipment of a physical good, or electronic transmission of a digital good such as a music file.

In fulfillment of the guarantee established by the EFT credit message, funds are settled once a day in step 2M between user's bank 220 and the merchant's bank 275 through the EFT switch 270. Typically, hundreds or thousands of such payments occur back and forth between bank 220 and bank 275 during the day and for efficiency purposes, the actual net funds due from one bank to the other are only transferred once per day. For example, one bank 220 might have guaranteed $10,000 in EFT credit messages from one hundred of its customers to the other bank 275. On the same day the other bank 275 might have guaranteed $12,000 in EFT credits from fifty of its customers to the other bank 220. At the end of the day, bank 275 only sends the difference, $2,000, to bank 220 and each of the banks 220, 275 ensure that the proper accounts in its own bank are debited and credited for the payments. As can be readily appreciated each bank performs this end of day settlement with hundreds of other banks, as is presently done with the current ATM system 270 transfer of funds. Again on a daily basis, the funds received into the merchant's VPL account 235 are swept by an automatic process into the merchant's cash concentration account 280, which can be a DDA or IPA account.

As is readily appreciated from the above description, the Web Broker enhanced Wallet 215 and the Virtual Private Lockbox (VPL) 235 significantly enhances the consumer and merchant experience when used for web shopping. The present invention completely solves one of the biggest problems of the prior art, the hesitancy of a consumer to provide financial account information over the Internet. Rather than the merchant "pulling" in the consumers account information and requiring authentication of the consumer, the Web Broker enhanced Wallet 215 "pushes" an EFT credit message to the merchant's Virtual Private Lockbox, without the merchant ever obtaining the consumers account information. This transaction is virtually instantaneous, provides privacy, security, and convenience to the consumer—and guarantees funding, provides reconcilement, and supplies archival records to the merchant.

With respect to authentication, because the consumer is pushing the payment to merchants or other entities or individuals, rather than the merchants pulling payments from consumer accounts, the consumers do not need to authenticate themselves to the merchant. Rather, the consumers authenticate themselves to their own bank 220, which then executes the EFT credit payment to the merchant's VPL account 235.

This method of the present invention is quite attractive to consumers because they can pay any merchant regardless of the existence of a pre-existing relationship with that individual or entity. The transaction can furthermore be conducted from anywhere there is access to the Internet. The IPA account 230 can be used and managed through the consumer's PC, a web enabled ATM, by phone or by any other web enabled device. The present Internet shopping payment method is extremely easy for online banking customers to adopt. The method allows consumers to conduct online shopping without having to provide any personal confidential financial information to unknown merchants. The method allows consumers to conduct these financial transactions solely with her or his own financial institution.

With respect to merchants that are paid by the method of the present invention, there are several advantages. This method opens up a universe of buyers/payors who do not have access to or the desire to use credit or debit cards online. Very little effort is required on the part of a merchant which only has to publish its bank 275 and VPL deposit only account 235 information on its web site 255 or other public directory (see 335 in FIG. 3). If a merchant has been using traditional credit card methods, the present invention provides the merchant with significant savings in credit card processing, repudiation costs, fraud loss, and chargeback costs. The present invention also provides the merchant with the ability to economically accept micropayments.

FIG. 3 illustrates a second embodiment of the present invention in which the structures described above can be used by a user to pay anyone. The Web Broker 227 of the present invention provides the user with tremendous flexibility. Anyone using a Web Broker 227 can conveniently send funds to anyone else with an IPA/VPL account. This funds transfer is instantaneous and at no cost to the consumer, and is conducted in a secure environment.

As described above with respect to the Internet shopping model illustrated in FIG. 2, in the pay anyone model of FIG. 3, in steps 3A-3C, the user logs onto the Internet, launches its browser (not shown in FIG. 3) and launches the Wallet 215. In the embodiment of FIG. 3, the Wallet 215 is a traditional Wallet with the appropriate interface to the Web Broker 227. When the user wants to activate the Web Broker 227, the user is required to key in its user ID and password, by which the user is then authenticated and has access to their the accounts 230 associated with the Web Broker 227. The user is then presented with its account balance information and can select from several options including Shop on the Web, Pay Anyone, Pay Bills, Pay Anyone, Fund Wallet, Review Account Activity, Edit Wallet information, or Go to Customer Service.

In the present embodiment illustrated in FIG. 3, the user selects the Pay Anyone option from the menu and the user is presented with several options in the Pay Anyone menu screen in step 3D. These options include: manually keying in the payee's VPL number; selecting a prior payee from a drop down menu; Add/Remove/Edit a payee from drop down menu; and the option to go to an online directory (325) of VPL numbers of various payees. In the particular embodiment illustrated in FIG. 3, the user keys in (or selects) the payee's VPL address, the dollar amount of the payment, and a description of the reason for the payment, the description being optional.

In step 3E, the above described payment information is transmitted to payee's Wallet 315 (or Web Broker 227, not illustrated). The payee's Wallet 315 verifies the VPL number specified by the user and provides an authorization to make the payment. In step 3F, the payee's Wallet 315 confirms that the information is correct and transmits to the user (payor) a payment message with the following data: Payee BIN; Payee Account #; Transaction ID; the dollar amount of the payment; and an optional description. In step 3G, upon receipt of the payment message, the user reviews the message and selects "OK to Pay". Step 3D through 3G are an optional process since the Web Broker 227 can unilaterally initiate the push of an EFT credit message without ever having contacted the receiver of the credit. In such a blind push of a credit it is recommended that the Web Broker 227 consult an online directory 325 to verify the accuracy of the address to which the EFT credit message is to be sent.

In step 3H, the user's Web Broker 227 sends the payment authorization 225 to the user's IPA account 230. In parallel, the user's Web Broker 227 transmits a payment confirmation of the expected payment to the payee's Wallet 315 or Account Reporter 340 which creates an expected payment record 350. The user's Web Broker 227 goes through the certification as described above in order for the user's bank 220 to properly identify the payment authorization 225. In step 3I, the EFT credit message is passed from user's IPA account 230 to the payee's VPL 335 via the ATM switch 270. As described above, the payee's VPL 335 may actually be the receive only address of an IPA account maintained by the payee.

In an alternative embodiment, a verification message is first sent though the EFT network 270 to the destination account 335. The purpose of this verification message is to verify the existence and identity of the VPL account 335. In response to the receipt of the verification message (assuming the VPL address was accurate and the message was received), the VPL account sends back a response message that includes a text description of the owner/user of the VPL account 335. This response message is then displayed to the user via the Web Broker 227 so that the user can verify that the account 335 to which it is about to send a credit is actually owned/used by the party to which the user intend to send the credit.

This verification procedure can be used in the Internet shopping model described above with respect to FIG. 2. In fact, the verification procedure is useful in thwarting any attempts at hacking of the VPL address transmitted (step 3F in FIG. 3 and step 2F in FIG. 2) via the Internet in the payment message from the merchant (255 in FIG. 2) or other payee (represented by Wallet 315 in FIG. 3). For example, if the payment message originated from Amazon™ and included Amazon's VPL 335 address, the verification procedure described above through the secure EFT 270 network would inform the user that the owner of the VPL 335 was truly Amazon. If a miscreant (e.g., Joe Hacker) had intercepted the payment message and inserted its own VPL address, the response message in accordance with the verification procedure will visually inform the user that the VPL address to which it will send the credit is owned by Joe Hacker. At this point the user can abandon the transmission of the EFT credit and try and identify Amazon's true VPL address.

In an alternative verification procedure, the Web Broker 227 can echo back to the sender of the payment message (merchant 255 in FIG. 2 or Wallet 315 in FIG. 3), the VPL address contained in the payment message. The sender can then verify for itself that the user has the correct VPL address to which to send the credit. This alternative verification process requires the hacker to intercept and alter two separate messages. Although better than no verification, the alternative procedure is still not as attractive as the EFT network 270 verification as it occurs in the unsecured Internet space.

Returning to FIG. 3, in response to the receipt of the EFT credit message by the payee's VPL 335, a payment record 345 is generated (step 3J). Upon the receipt of the payment record 345, the payee's Wallet 315 or Account Reporter 340 in step 3K is able to reconcile the expected payment record 350 against the actual payment record 345. Further in response to the receipt of the EFT credit message, the payee bank 375 credits the payee's VPL account 335 and the payee now has immediate use of funds. These funds can in turn be used for web shopping, bill payment, pay anyone, or can be withdrawn at an ATM using the card feature described below.

In concluding the pay anyone process, as with the embodiment illustrated in FIG. 2, finds are settled once a day between the user's bank 220 and the payee's bank 375 (step 3M), and the funds can be swept into the payee's DDA or other IPA account 380 (step 3N).

The pay anyone process described above is a very attractive payment method for consumers. For example, the consumer might be responding to a classified advertisement (electronic or traditional paper) or purchasing an item or a service through an electronic auction site such as eBay™. In either of these cases, the consumer can obtain the payee's VPL account 335 information (e.g., BIN, account number . . . ) in a variety of ways. In one method, the consumer obtains this information electronically from the service where it contacted the individual (e.g., through eBay™). Alternatively, the consumer can obtain the necessary destination account information through offline methods such as the traditional paper classified advertisement or through an Email which has been "pushed" to the consumer by the potential payee. The potential payee is protected using these methods since the VPL account 335 is a receive only account and no one can access the account to fraudulently withdraw money from the account. The user can furthermore obtain the payee information from the online directory 325, from a pull down menu on the Wallet 215 or by keying in the information manually.

Figure 4:
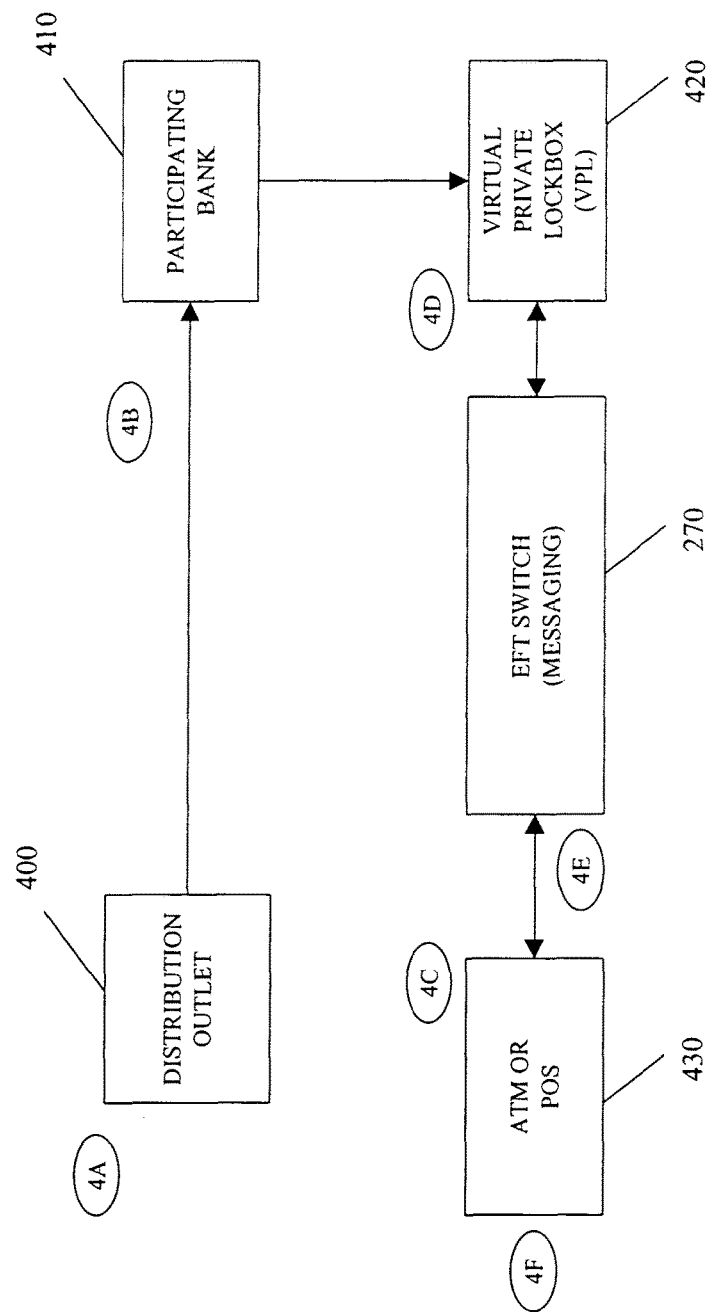
FIG. 4 illustrates a prepaid cash card embodiment of the present invention.

FIG. 4 illustrates an embodiment of the present invention involving a physical card associated with a VPL or IPA account. In this embodiment, the physical cards are linked to IPA or VPL accounts containing an initially established pre-set amount of cash. The card is issued to the IPA or VPL account user in order for the user to access the IPA or VPL account in the physical world. Furthermore, the cards can be purchased at vending machines placed in convenient e-commerce locations or other distribution outlets such as at the mall, convenience stores, or banks. In a preferred embodiment, when a user establishes a traditional Wallet 215, the user is offered an option to establish an IPA/VPL account, receive a Web Broker enhanced Wallet 215, and receive a physical card associated with the IPA/VPL account. Upon selecting this option, the card is mailed to the IPA/VPL user.

In the vending machine embodiment, the card is purchased from the vending machine with pre-funded with set increments of currency. These increments are associated to specific account number ranges, and are linked to IPA/VPL accounts. In one embodiment, the physical card is pre-activated (i.e., ready for immediate use). Alternatively, the card can be automatically activated upon its disbursement from the machine, or by the consumer making a toll-free call to a customer service line, or activated upon the user's first use of the card. The purchase of a card at a vending machine establishes a IPA/VPL account for the purchaser. As an alternative to the preset association of a card to an account and dollar amount, the association of the card to the account and the finding of the account can be accomplished dynamically as the user is purchasing the card.

Once purchased, the cards can be accepted at ATM's and merchants that are outfitted with card readers. Since the cards are PIN protected, they are safer than cash. The card has the IPA/VPL account number as well as a PIN. The PIN is printed on a sticker affixed to the back of the card when the card is issued. The account number is stored on the magnetic stripe on the back of the card. The VPL portion of the account associated with the card can receive EFT credits as described above and can funded from other accounts as also described above. The card can be used to withdraw funds at an ATM and make purchases from any merchants that accept debit cards.

For card purchased by someone who did not previously have a IPA account, in order to subsequently use EFT credit pushes as described above, the card owner will be required to establish an IPA account with the sponsor of the card. For example, if the sponsor was a bank, the user signs onto bank's website, the new card owner keys in the card number and PIN to synchronize the VPL with a newly created IPA account for the user. This synchronization will add the IPA account to the card link. The user can then specify against which account portion, IPA or VPL, debits will be made when using the card. The user will also be asked to indicate whether any funds received by the VPL will be swept to the newly created IPA or to an existing DDA account.

One specific embodiment purchasing and using a physical card is illustrated in FIG. 4. In step 4A, the purchaser selects a card from either a vending machine 400 or a vending enabled ATM (not shown) or other distribution outlet. In a preferred embodiment, cards can be purchased for as little as a $1, or in larger ATM-like increments. After making a selection, the purchaser is prompted to pay for the card. Several purchasing options are available, including cash, debit cards and credit cards.

In step 4B the card is disbursed from the machine 400 with a pre-assigned PIN as well as instructions for using the card. The card is either pre-activated or alternatively, the dispensing machine 400 sends an activation message to the card sponsor upon its purchase, or the card is activated upon its first use, or the user can phone in to activate the card. The distribution outlet (e.g., vending machine) also provides the purchaser with a printed receipt that can be used in the event that the user loses the physical card.

With the card in hand, the user is able to withdraw funds from the account associated with the card or making store purchases using the card. In step 4C, the card owner inserts the card into an ATM machine 430 or a merchant card reader at a merchant's Point Of Sale Location. The user then keys in the PIN number to identify her or himself as the proper owner of the card. In step 4D the merchant's card reader, which is connected to the EFT network 270, transmits a debit message through the EFT switch 270 to the sponsoring bank 410.

As similarly depicted in FIG. 2, the debit message is seen as being received directly by the user's VPL account 420, but in practice, it is realized that all EFT messaging occurs through the systems of the bank 410. The message is transmitted to the bank 410 as an online PIN debit transaction against the user's VPL account 420. Upon verification that there are sufficient funds available in the VPL account 420 associated with the requesting card, the transaction is authorized by the VPL sponsor 410 and the funds are deducted from the balance in the VPL account 420. In step 4E, the authorization message is transmitted back to the ATM or POS 430 through the same EFT network 270 and the funds are released to the card owner (in the case of an ATM withdrawal) or credited to the merchant (store purchase) in step 4F.

Figure 5:
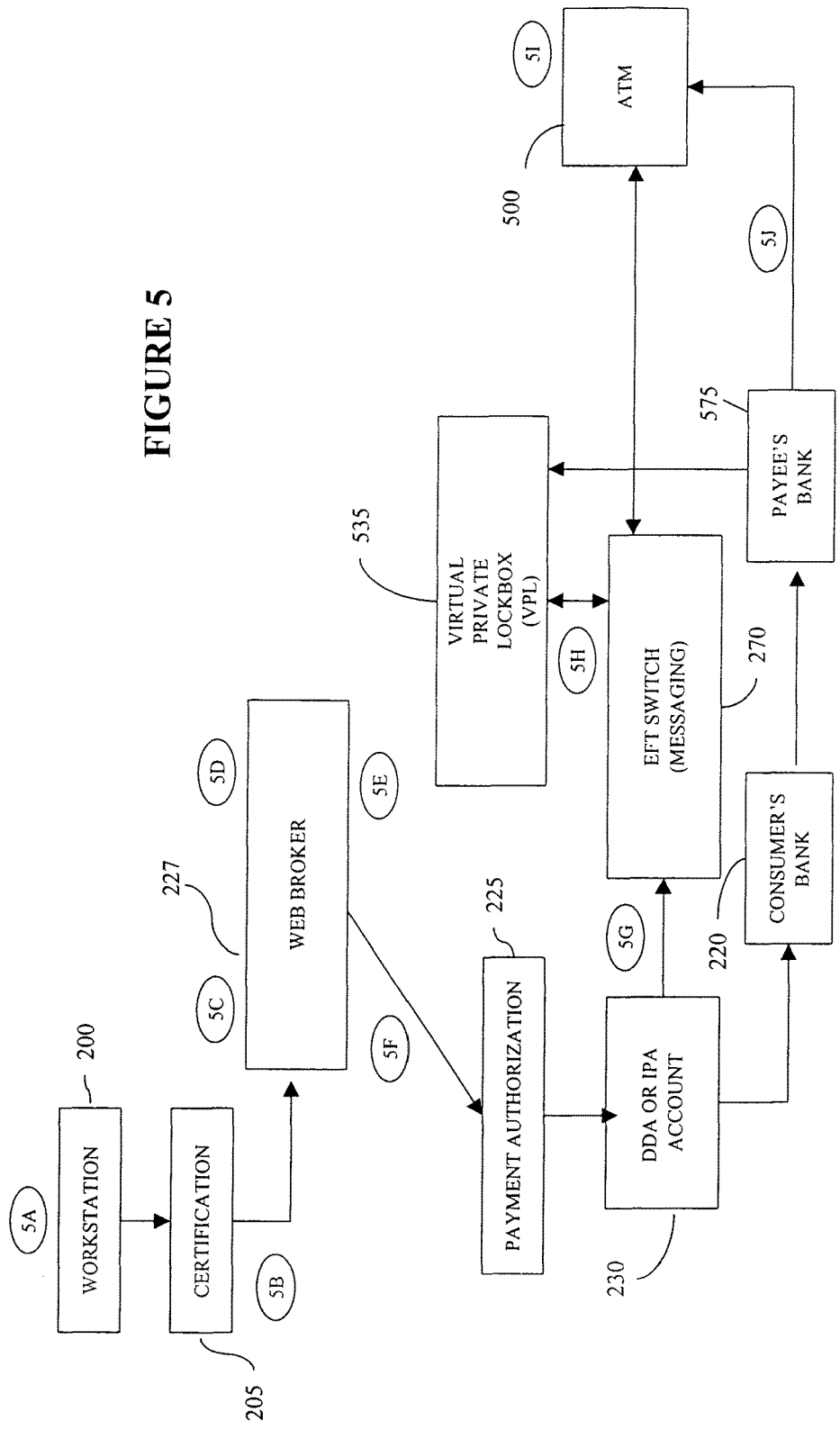
FIG. 5 illustrates a pay anyone embodiment of the present invention.

FIG. 5 illustrates an embodiment of the present invention in which the user can instantly transmit funds to anyone, specifically some one with a card and VPL account as described above. The payee (recipient of the funds) can withdraw the funds via an ATM through the use of the physical card, which the payee can either purchase at a vending machine or receive by mail when establishing an account, as described above. As with all of the embodiments of the present invention, this pay anyone feature ensures that the transaction is conducted in a secure environment.

As described above with respect to the embodiments of FIGS. 2 and 3, in the pay anyone method of FIG. 5, in steps 5A-5C, the user logs onto the Internet, launches its browser (not shown in FIG. 5) and launches its Web Broker 227. As readily appreciated in FIG. 5, a traditional Wallet 215 is not required to practice the essential features of the present invention, as these features are enabled by the Web Broker 227. In FIG. 5, the Web Broker 227 operated as a stand alone component. As previously described, the Web Broker 227 is preferably a software application that operates on one or more processors, preferably an Internet server. In the preferred embodiment, the majority of the Web Broker 227 application resides on a server at a financial institution, such as a bank. Using thin client technology, some part of the Web Broker 227 application is operable on the user's processor 200 The Web Broker 227 requires that the user keys in its user ID and password, by which the user is then authenticated and has access to their Web Broker 227. The user is then presented with its account balance information and can select from several options including Shop on the Web, Pay Anyone, Pay Bills, Fund Wallet, and Check Account Activity. In the present embodiment illustrated in FIG. 5, the user in step 5D selects the Pay Anyone option from the menu and is prompted for the VPL number of the account associated with the card. The procedure set forth above with respect to the pay anyone method of FIG. 3 is then followed.

In step 5E, user's Web Broker 227 generates a payment authorization with the following data: Payee BIN; Payee VPL number (card number); Transaction ID; and dollar amount. After reviewing the information, the user then selects "OK to Pay" on the workstation 200 screen (e.g., PC, PDA . . . ). In step 5F, the user's Web Broker 227 verifies the balance in the IPA account 230 and passes the payment authorization to IPA 230 if there are sufficient funds in the account 230 to cover the transaction. As an optional step, the payee information is validated (i.e., the VPL account associated with the card is valid and is owned by the intended payee). In step 5G, the EFT credit message is passed via the ATM switch 270 from user's bank 220 (IPA account 230) to the payee's bank 575 (VPL account 535).

The payee can withdraw the funds via an ATM 500 through the use of the physical card as described above. When the withdrawal is requested, a debit payment message is transmitted in step 5H from the payee's VPL account 535 to the ATM 500 provider bank (not shown). The payee now has immediate use of funds, and the withdrawal is made in step 5I. Alternatively, the payee can use the card at a POS using the above described PIN debit procedure. As with the previous embodiments, funds are settled once a day between the payor's bank 220, the VPL user's bank 575, and the ATM 500 provider bank.

The present embodiment is well suited for many different situations. For example, if a parent has a son or daughter away at college, the parent has provided the child with a card and associated VPL account 535, and is able to transfer funds to the child's account 535 in a simple, quick and cost efficient manner by use of the present invention. Those skilled in the art will appreciate that the above embodiment can be used by a customer of the bank to transfer funds to anyone, such as the customer's gardener or a child at college as described above.

Figure 15:
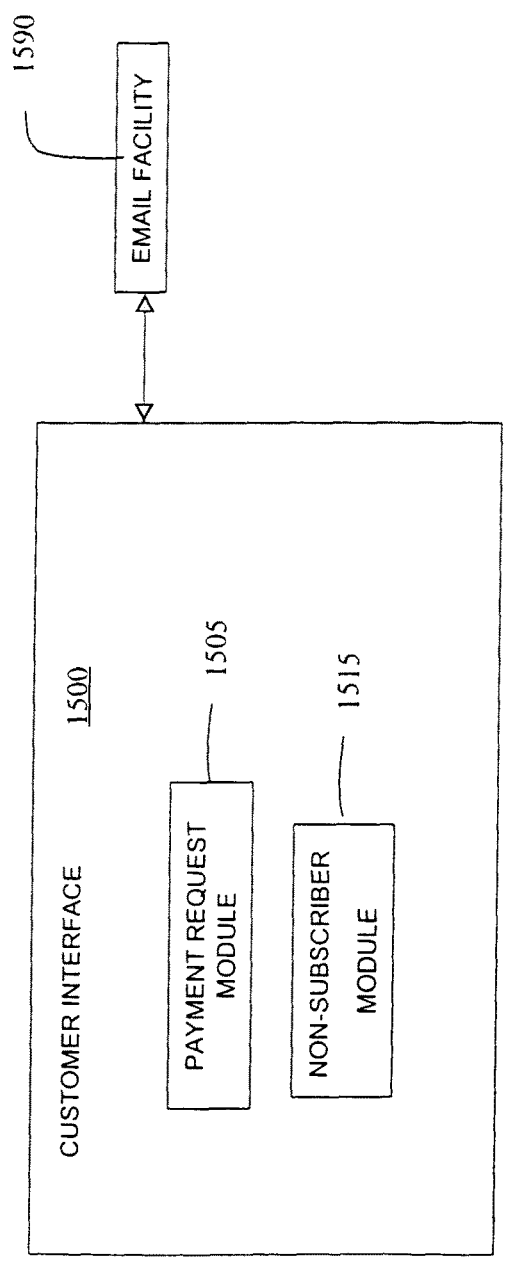
FIG. 15 illustrates an embodiment of the Customer Interface.

In a complimentary service to the pay anyone service as described with respect to FIG. 5, a user of the system is additionally capable of requesting a payment from another person as illustrated in FIG. 15. In this embodiment of the present invention, if the person from whom a payment is requested already has an IPA/VPL account, the payment requester instructs a Payment Request Module 1505 of the Customer Interface 1500 to send an email to the person (payment requestee) that includes the payment request. The Payment Request Module 1505 uses an Email facility 1590 that is coupled to the Customer Interface 1500 in order to transmit the actual payment request to the payment requestee. Upon the transmission of the email, the Customer Interface 1500 sets up a pending payment in the payment requestee's account. In an alternative embodiment, no actual email is sent to the payment requestee and he/she will learn of the requested payment only upon logging onto the system. When the payment requestee next logs onto the system, he/she is notified that the payment requester has made the request and asks the requestee if he/she want to push the payment to the requestor in fulfillment of the request.

For example, Mr. Smith's gardener might send a request for payment to Mr. Smith with respect to a lawn service provided by the gardener. The gardener simply issues an email to Mr. Smith (through the system) that contains the request. In response to the issuance of the email, the Payment Request Module 1505 links the payment request to Mr. Smith's account. The next time Mr. Smith logs onto the system, he is prompted to satisfy the requested payment to the gardener. The email issued to Mr. Smith preferably includes a link, such that Mr. Smith is automatically logged onto the system and is able to push the already configured payment to the gardener.

In an alternative embodiment, a potential payee is capable of sending a payment request to anyone with an email address, regardless of an whether that person is not a subscriber to the system (i.e., does not have an IPA 230 or VPL 235 account). In this embodiment, the Payment Request Module 1505 coordinates with the Non-Subscriber Module 1515 to transmit an email (using Email Facility 1590) to the potential payor that includes the payment request. The email further includes a link back to the system that allows the recipient (the potential payee) to log onto the system, become a participant, establish an account (e.g., an IPA 230 and/or VPL 235 account) and make the requested payment. Alternatively, when the non-participant receives the email and logs onto the system, the person can confidentially enter her/his DDA account number and allow the system to push a payment to the requestor's account without the person having to establish any account in the system. This processing of payments by the non-subscriber is preferably performed by the Non-Subscriber Module 1515. In this manner, the person's account information is kept confidential by the system and the requester receiving the payment has no knowledge of the account from which the payment was pushed.

In a further associated service, a subscriber (a registered user of the system that has an IPA 230 or VPL 235 account) can push a payment to a non-subscriber. Again, this processing of payments to non-subscribers is preferably performed by the Non-Subscriber Module 1515. In this embodiment, the subscriber enters the non-subscriber's email address and the amount of the payment and the Non-Subscriber Module 1515 sends an email notification to the non-subscriber. Again, the email notification contains a link that allows the non-subscriber to log onto the system and receive the payment. The payment can received by the non-subscriber in a number of ways. In a first embodiment, the non-subscriber establishes an IPA 230 and/or VPL 235 account and thus becomes a subscriber. The payment can then be pushed from the sender's account to the new subscriber's newly established account. Alternatively, the non-subscriber can confidentially enter her/his DDA account number and allow the system to push the payment from the subscriber's account to the non-subscriber's account without the non-subscriber having to establish any account with the system.

In a further embodiment, the Non-Subscriber Module 1515 automatically establishes an account for the non-subscriber. In one alternative, the email sent to the non-subscriber contains an authentication means such that when the non-subscriber tries to access this new account, the Non-Subscriber Module 1515 has a mechanism for authenticating the non-subscriber. For example, the email might contain a password or other mechanism (e.g., and answer to a secret question) that the non-subscriber must enter when she/he tries to access the account. In an alternative embodiment, the non-subscriber is sent a physical ATM card that is linked to the newly established account. The non-subscriber is also provided with a password (or other authentication/security mechanism) that must be used when the physical card is used to access the account. In accordance with this embodiment, a non-subscriber that does not even have access to the Internet and/or does not even have a bank account is able to be pushed electronic payments. In a preferred embodiment, any payments pushed to non-subscribers in this manner and any new accounts thus established are set to expire if the payment is not retrieved or if the account is not accessed in a certain amount of time (e.g., thirty days).

As is appreciated, the Customer Interface 1500 and each of the modules contained therein are preferably software applications operable on one or more processors. In a preferred embodiment, the Customer Interface 1500 and its modules operate on an Internet server. Although illustrated in FIG. 15 as being a separate component, the Email Facility 1590 can be incorporated into the Customer Interface 1500. Similarly, the functions performed by the Payment Request Module 1515 and the Non-Subscriber Module 1515 can be separately operated outside the Customer Interface 1500.

Figure 6:
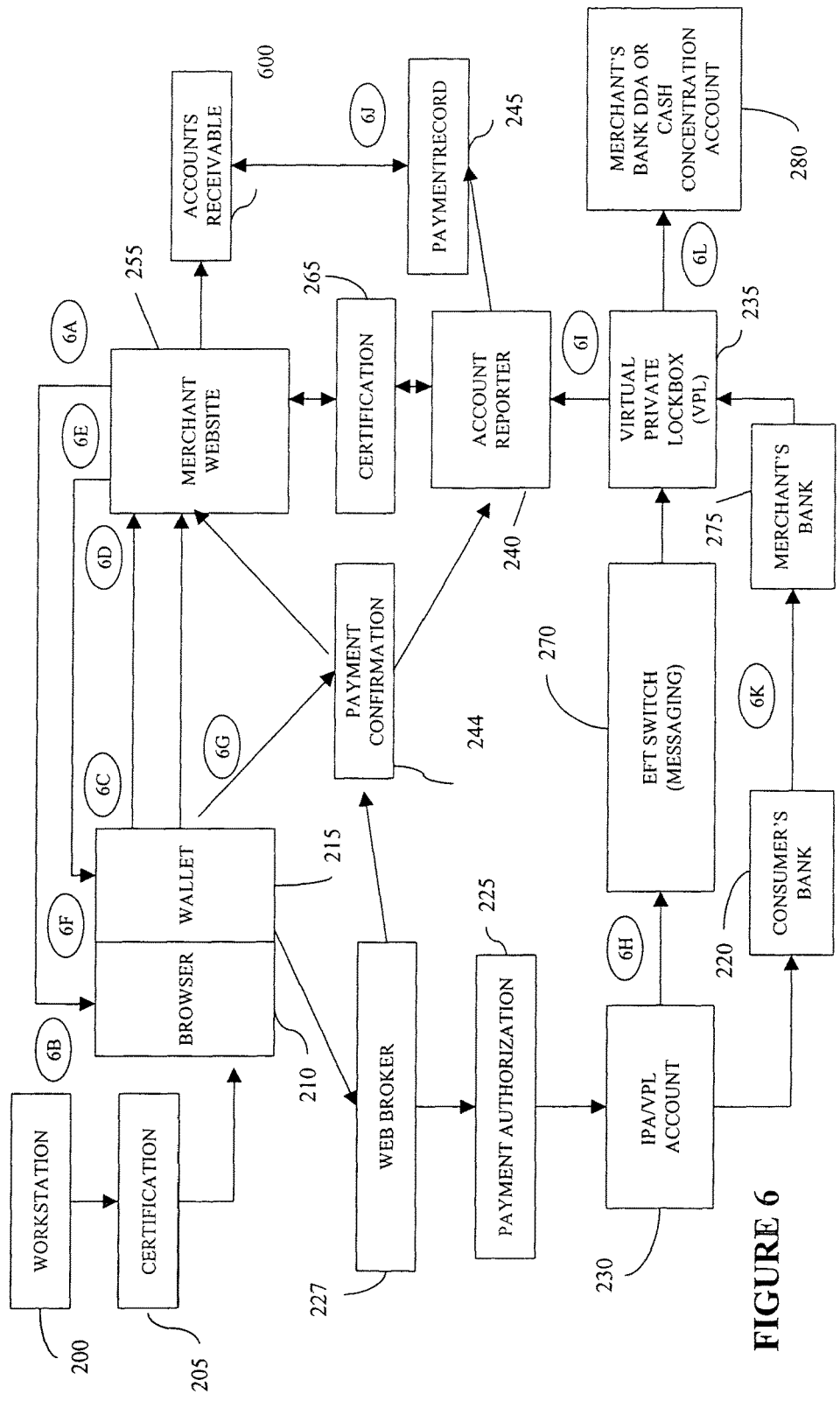
FIG. 6 illustrates a bill payment, biller direct embodiment of the present invention.
Figure 7:
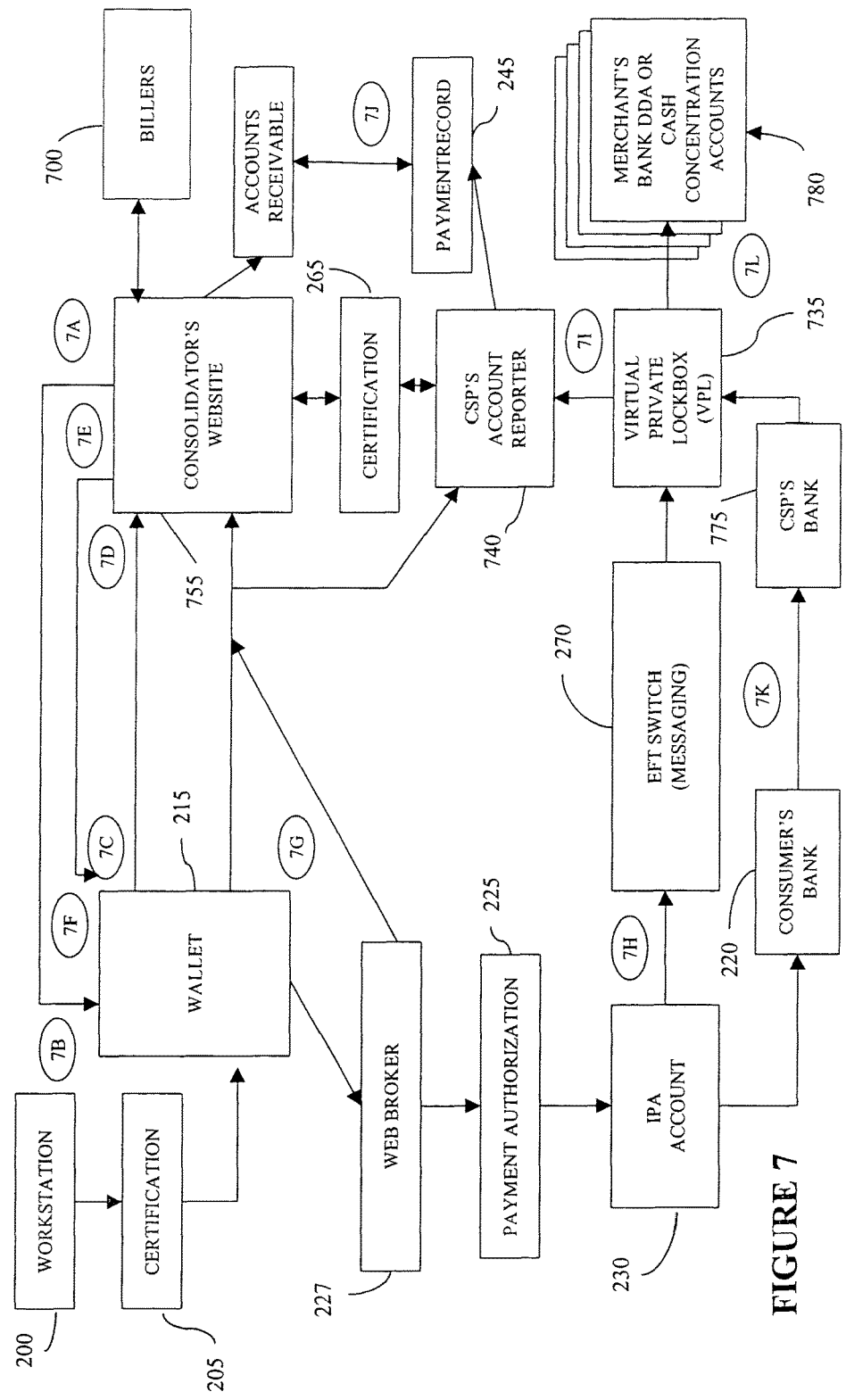
FIG. 7 illustrates a bill payment, service provider consolidation embodiment of the present invention.
Figure 8:
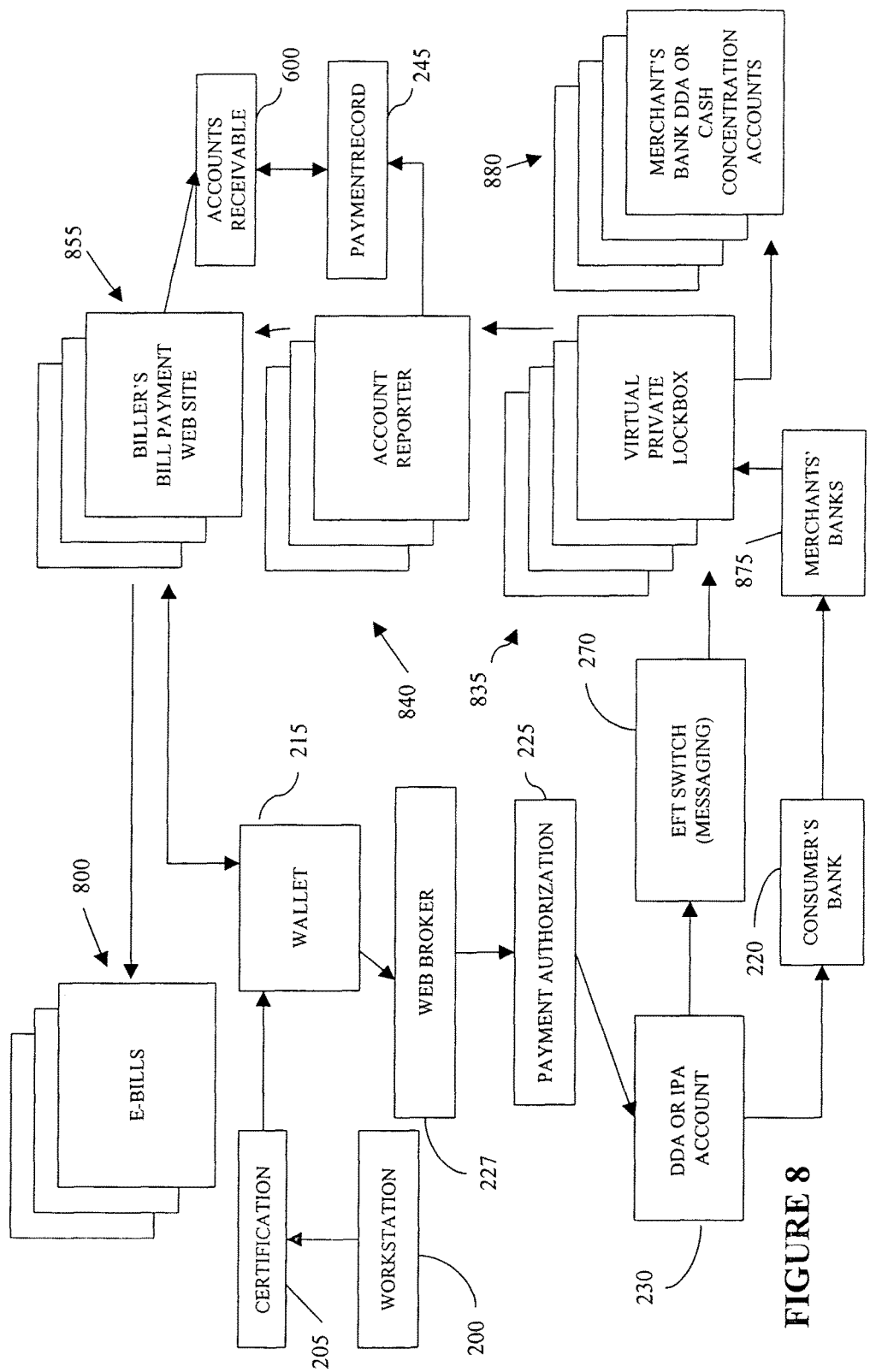
FIG. 8 illustrates a bill payment, customer consolidation embodiment of the present invention.

FIGS. 6, 7 and 8 illustrate three different bill paying embodiments according to the present invention. FIG. 6 depicts a direct bill paying embodiment, FIG. 7 describes bill payment including a service provider performing consolidation, and FIG. 8 explains a bill payment method in which the customer performs the consolidation. In FIG. 6, the direct method, a biller establishes an e-billing capability on its own web site 255. Once enrolled in the service, the customer receives an e-mail notification that a bill is available for payment at the biller's web site 255. Alternatively, the customer can receive a traditional paper bill. The customer launches its Wallet 215, Browser 210 and Web Broker 227 and then accesses the biller's web site 255. A payment is then eventually transmitted from the Web Broker 227 to the biller's Virtual Private Lockbox 235. As in all of the embodiments of the present invention, the transaction is secure, protects the customer's privacy, and provides the biller with guaranteed funding, reconcilement, and archival records.

According to one embodiment of the present invention, a plurality of invoice templates are available for use by billers/merchants. Billers and merchants can additionally create their own custom invoice for use with the components of the present invention in order to present bills/invoices to consumers. Alternatively, in a bill payment embodiment in which the bill payment is initiated by the consumer, the consumers have available to them a plurality of invoice templates that can be filled out by the consumer when making a payment.

As is illustrated in FIG. 6, the biller/merchant first establishes an e-billing relationship with its customer. One way in which the merchant might do so is to advertise its e-billing service via e-mail, mail, or on the Internet. In step 6A, it is assumed the user has enrolled in the e-bill service at biller's web site 255 and is receiving monthly Email notification when bills are available. As previously described, in step 6B the user logs onto the Internet, launches its browser 210, Wallet 215 and Web Broker 227 and is presented with the various menu options. In step 6C, the user selects the "Pay Bills" option and is given several options in the Pay Bills menu screen including "Pay Bills" and "Edit Billing information". Selecting the "Pay Bills" choice, the user navigates to the biller's web site 255. It must be recalled that the Wallet 215 already contains user's billing info.

Since web Wallet 215 is active, biller's website 255 recognizes the user as a Wallet 215 customer. In addition, the biller's website in step 6D verifies that customer has an established e-billing relationship. In step 6E, the biller's site 255 generates and transmits to the user a bill payment message that includes the following data: Biller's BIN; Biller's Account number; Transaction ID; and the dollar amount of the bill to be paid. In step 6F, the bill payment message is received by the Wallet 215 window and is displayed for review by the user. The user has several options including at least the choice to edit the bill (e.g., the amount to be paid) or the option to pay the bill as presented.

If the user selects the "pay the bill" option, the Web Broker 227 verifies the user's balance in its IPA account 230 and passes the payment authorization 225 to the IPA account 230 while simultaneously transmitting a payment confirmation 244 to the biller/merchant's website 255 or VPL Reporter 240 (step 6G). As alternatively shown, the Web Broker 227 can transmit the payment confirmation 244 to the biller/merchant's website 255 or VPL Reporter 240. In response to the receipt of the payment authorization 225, the EFT credit message is passed from the user's IPA account 230 to the biller's VPL account 235 via the ATM switch 270

(step 6H). A bill payment record 245 is then generated and stored by the biller's Account Reporter 240 in response to the receipt of the credit message from the EFT network 270.

In step 6J, upon generation of the payment record 245 which reflects the receipt of the funds to settle the bill, the payment record 245 is reconciled against the biller's accounts receivable files 600. As previously described, with the VPL account 235 and the Account Reporter 240, a billing merchant can execute secure transaction fulfillment, reconcile all its accounts, while securely archiving all its records for later, simple retrieval. As described above with respect to other embodiments, funds are settled once a day between user's bank 220 and the biller's bank 275 (step 6K). The funds can be swept to the biller's DDA or cash concentration account 280 (step 6L).

FIG. 7 depicts a further bill payment method involving service provider consolidator. This bill payment method is similar to the first illustrated in FIG. 6, however in this method a central service provider consolidates e-bills from many different billers 700. The service provider's site 755 enables a customer to review and pay bills with respect to several if not all of its billers (e.g., electric bill, phone bill, mortgage . . . ). The service provider is seamlessly outfitted with an archival capability, so that customers can review their bill payment history. The Web Broker 227 and IPA 230 once again provides the consumer with privacy, security and convenience while the VPL provides the service provider (and its customers, the biller/merchants) with guaranteed funding, reconcilement and archival records.

In step 7A, the user enrolls in the e-bill service at web site 755 of the Customer Service Provider (CSP). The e-billing relationship between the CSP and the user is established either directly in response to advertising by the CSP or though the billers 700 (customers of the CSP) advertising the services of the CSP to the users (who are customers of the billers). While enrolling (or at a later time) the user selects which bills it wishes to receive and pay electronically through the CSP's service. The CSP can offer an archive service to billers 700 in order to store transaction history as well as providing a customer service unit to resolve transaction inquiries.

After enrollment, the user then begins to receive monthly email notification when bills are available from the billers 700 chosen by the user. The e-bill can be sent to the user either by the CSP or directly from the biller 700 to the user. In this second method, the biller must provide the CSP with an accounts payable file reflecting the e-bills it sent out, in order for the CSP to perform the below described reconciliation process for the biller 700. If the CSP is the party transmitting the e-bills to the users, the billers 700 must provide the CSP with the billing information. Many types of record keeping methods are supported. The billers 700 can push the billing information directly to the CSP's web site, or alternatively, the electronic bills can be channeled to the CSP via Spectrum or other electronic Internet bill payment aggregators.

Steps 7B and 7C are essentially the same as described above with respect to the direct bill paying embodiment of FIG. 6. The only difference is that after choosing the "Pay Bills" option, instead of navigating to the biller's site directly, the user navigates to the CSP's web site 755. In step 7E, the user selects which bills to pay, and keys in the dollar amount to be paid on each bill (or selects the default, which is to pay the entire amount of the bill that was presented to the user). In step 7F, CSP site 755 generates and transmits to the user one or more bill payment messages. In one embodiment, the CSP generates a single payment message that includes the appropriate payment information for all of the bills paid during the session. In an alternative embodiment, a separate payment message is generated for each of the bills paid by the user. In either embodiment, the message would include: the CSP's BIN; the CSP's VPL account number; a transaction ID (or IDs); the biller(s) name(s) and the dollar amount(s).

Steps 7F through 7L are essentially the same as described above with respect to steps 6F through 6L of FIG. 6 and the elements that are the same shall not be repeated. Although only a single VPL account 735 is illustrated in FIG. 7, it is appreciated that the CSP (or the billers directly) may maintain a VPL account 735 for each biller. Regardless of whether there is a single VPL 735 or several, the billers 700 themselves may view the contents of their receipts in the VPL 735 through the CSP's Account Reporter 740. In step 7J, the CSP performs the reconciliation process for each of its customers (i.e., the billers 700). In Step 7L, each biller's receipts are swept into their respective DDA or cash concentration accounts 780.

FIG. 8 illustrates the third bill payment embodiment involving customer consolidation. In this third bill payment method, the e-bills 800 are delivered directly to the customer in the form of an e-mail or other delivery means. Each e-bill 800 contains a hotlink, which directs the customer to the biller's web site 855 (or to a CSPs website if the CSP handles the payments for the biller). When the customer activates its Wallet 215, the web site 855 recognizes the Wallet 215 customer and initiates a payment message as previously described. The customer can then push the payment to the biller in the same manner that a payment is pushed in the web shopping embodiment of FIG. 2, the pay anyone embodiment of FIG. 3, as well as the two other bill payment embodiments of FIGS. 6 and 7 using its Web Broker 227. As with all the previous embodiments, the biller once again receives the guaranteed finding, reconcilement, and archival records benefits of the present invention.

Figure 9:
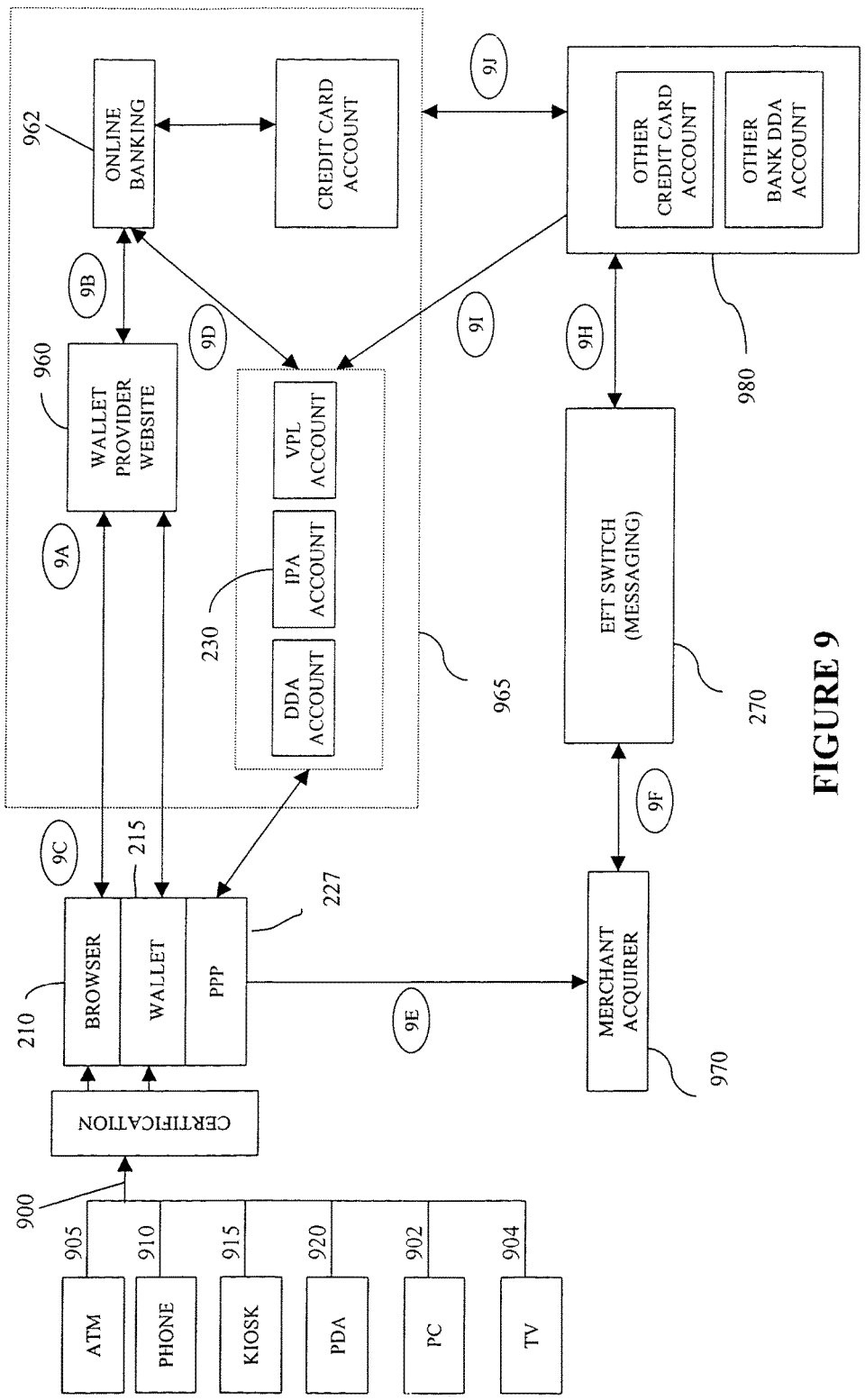
FIG. 9 illustrates a structure and process for funding an account associated with an electronic Wallet according to the present invention.

FIG. 9 depicts a system and method for establishing and funding accounts associated with a Web Broker 227 or a Web Broker enhanced Wallet 215. As described above, a user's IPA account 230 is accessed through a Web Broker 227 or a Web Broker enhanced Wallet 215 that can be accessed via the Internet 900, ATM 905, telephone 910, Kiosk 915, PC 902, an interactive TV 904, and even a Personal Digital Assistant (PDA) 920. The primary method for funding the accounts (e.g., IPA account 230) linked to the Web Broker 227 or Web Broker enhanced Wallet 215 is through one of the user's other accounts (e.g., DDA, or credit or debit card accounts). In a preferred embodiment, the Web Broker 227 or Web Broker enhanced Wallet 215 can receive funds from the other accounts of the user using well known online banking functionality. Alternative funding options can be achieved through an externally sponsored credit card, by check or money order, or through the ACH network.

Steps 9A through 9C illustrate one method by which a user can install a Wallet 215. As previously stated, the preferred embodiment includes an online banking system 962. The following example uses a fictional operator of the system denoted as XYZBank 965 which acts as a Web Broker enhanced Wallet provider. In step 9A, the user logs onto the Internet and uses its browser 210 to navigate to the XYZBank.com site 960. In step 9B, the user selects the "Wallet" option from main menu on the XYZBank.com site. On the "Wallet" screen the user is presented with two options: "Are you an Online Banking customer?" and "Are you a Non-XYZBank customer? If user selects "Online Banking customer", the user is presented with a list of the accounts held by the user at the XYZBank that are supported by online banking. The user then identifies the account(s) to which the Web Broker enhanced Wallet 215 will be linked. If the user desires, a new IPA account 230 can be established for the new Web Broker enhanced Wallet 215. If the user selects "Non-XYZBank customer", their Web Broker enhanced Wallet 215 is linked to an IPA account 230 newly set up for the customer at XYZBank 965.

Next, in step 9C the user sets up the Web Broker enhanced Wallet 215 for use by choosing "Install a Web Wallet" from the menu. The user is instructed that its Web Broker enhanced Wallet will now be installed as a button on the browser 210 toolbar. Once the software for the Web Broker enhanced Wallet 215 has been installed on the user's system (e.g., the user's PC or web server), the user is prompted to provide some background information that will assist the user in making web purchases and payments. An example of some of the background information requested includes the user's shipping name address. At this point, the Web Broker enhanced Wallet 215 installation is complete and the user can perform any of the methods described above with respect to FIGS. 1-8. As previously described, using thin Wallet technology, the majority of the software and data associated with the Web Broker enhanced Wallet 215 resides on a server maintained by the XYZBank 965.

Steps 9D through 9K illustrate two methods of funding the Web Broker enhanced Wallet 215. For customers of XYZBank 965, the primary method for initial and future funding of the Web Broker enhanced Wallet 215 is performed through a link between the Web Broker enhanced Wallet 215 and the Online Banking system 962 as described above. The link between the Web Broker enhanced Wallet 215 and the Online banking 962 can be transparent and the user can sign on solely to its Web Broker enhanced Wallet 215 and be seamlessly provided with the online banking 962 functionality. For initial funding of the Web Broker enhanced Wallet 215, the user selects "move funds to/from Wallet" from an online banking menu. The user then provides the following information: the source of the funds—checking, credit card, savings, etc.; the dollar amount of the transfer; the funding date; and whether this is one time transfer or a repeat transfer. Upon completion of above, the account associated with the Web Broker enhanced Wallet 215 is funded. Subsequent funding of the Web Broker enhanced Wallet 215 associated accounts can be done through the Web Broker enhanced Wallet 215 itself or through the online banking system 962. In addition to funding via online banking, instructions can be given for funding via phone 910, ATM 905, Kiosk 915, or PDA 920 or interactive TV 922.

Steps 9E through 9J illustrate a method of funding the Web Broker enhanced Wallet 215 from an external credit (e.g., cash advance from a credit card) or debit card, or an external DDA account (external to XYZBank). For the Non-XYZBank customer or an XYZBank customer wishing to fund the Web Broker enhanced Wallet 215 externally, the user in step 9E selects "fund with a non-XYZBank account". The user then selects the financial merchant of the account (e.g., American Express™, VISA™, etc.) and keys in account number, expiration (if applicable), and the dollar amount of the finding transfer. The funding request is transmitted to a merchant acquirer 970 associated with or part of XYZBank 962. This account information is stored for future funding requests.

In step 9F, the merchant acquirer 970 (such as Chase Merchant Services™) authorizes the funding transaction and passes the request through the EFT switch 270. In step 9G, the financial merchant 980 (e.g., VISA™) receives funding request via EFT switch 270, and verifies the card number, expiration, and credit limit. If the funding is authorized by the financial merchant (step 9H) the funds are received by the Web Broker enhanced Wallet 215, more specifically, the IPA/VPL account 230 linked to the Web Broker enhanced Wallet 215 (step 9I). The funds settlement (step 9J) between the credit card's bank and user's bank typically occurs once per day. A similar process occurs when the funding is from a user's DDA account at another financial institution 980. In the above description with respect to FIG. 9, it is appreciated that the procedure for establishing and funding a Web Broker enhanced Wallet 215 equally apply to establishing and funding a Web Broker 227 as a stand alone product.

Figure 10:
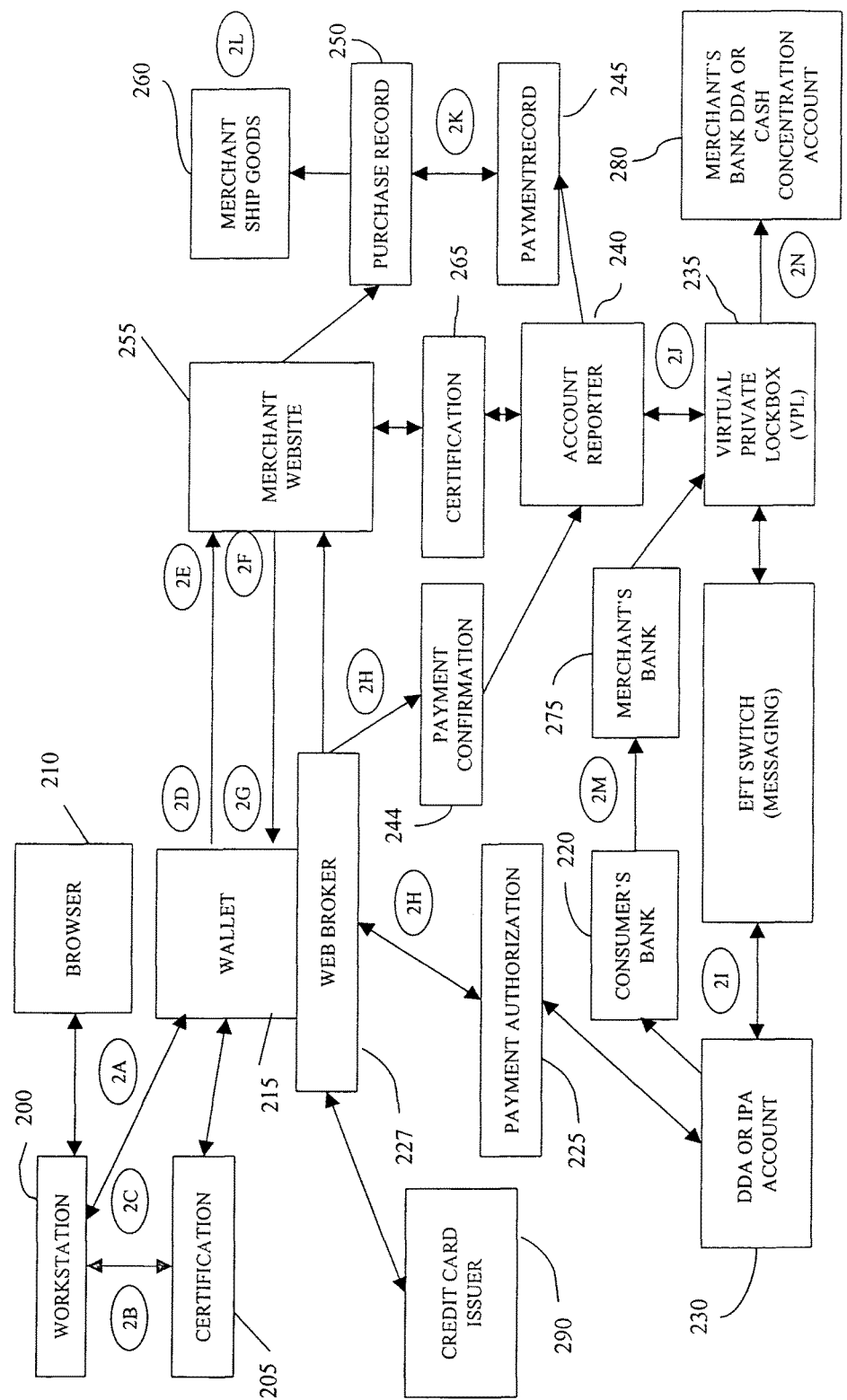
FIG. 10 illustrates an embodiment of the present invention in which EFT credit pushes are funded by a user's credit card.

FIG. 10 illustrates an alternative embodiment of the present invention in which the IPA user is able to fund payments according to the present invention using a credit card. Although the illustration of FIG. 10 and following description is made with respect to the Internet shopping embodiment of FIG. 2, this alternative credit card embodiment is equally applicable to the embodiments of FIGS. 3-8. Unless otherwise specified, all of the steps of the embodiment of FIG. 10 are the same as described with respect to FIG. 2.

In step 2H, when the user agrees to make the EFT credit payment, the user is given the option to fund the payment with his or her credit card. The Web Broker 227 either already knows the user credit card number or prompts the user for the number. The Web Broker 227 then contacts the credit card issuer 290 as described above with respect to FIG. 9 for authorization for the credit in the amount of the payment. When the authorization is returned, the Web Broker 227, transmits the credit to the IPA account 230 simultaneously with the transmission of the payment authorization. The IPA account 230 then has sufficient funds to transmit the EFT credit to the merchant's VPL account 235 as described above. At the end of the day, a settlement occurs between the bank 220 and the credit card issuer 290 in the amount of the credit. This settlement is similar to the settlement (step 2M) between bank 220 and bank 275.

Using this embodiment of the present invention, a user is able to continue to use its credit card for online purchases, but because of the unique features of the IPA account and the EFT credit push, the user only has to give its financially sensitive information (i.e., credit card number) to its trusted institution. In this embodiment, the user of able to fund larger purchases than would normally be found in the IPA account 230.

Figure 11:
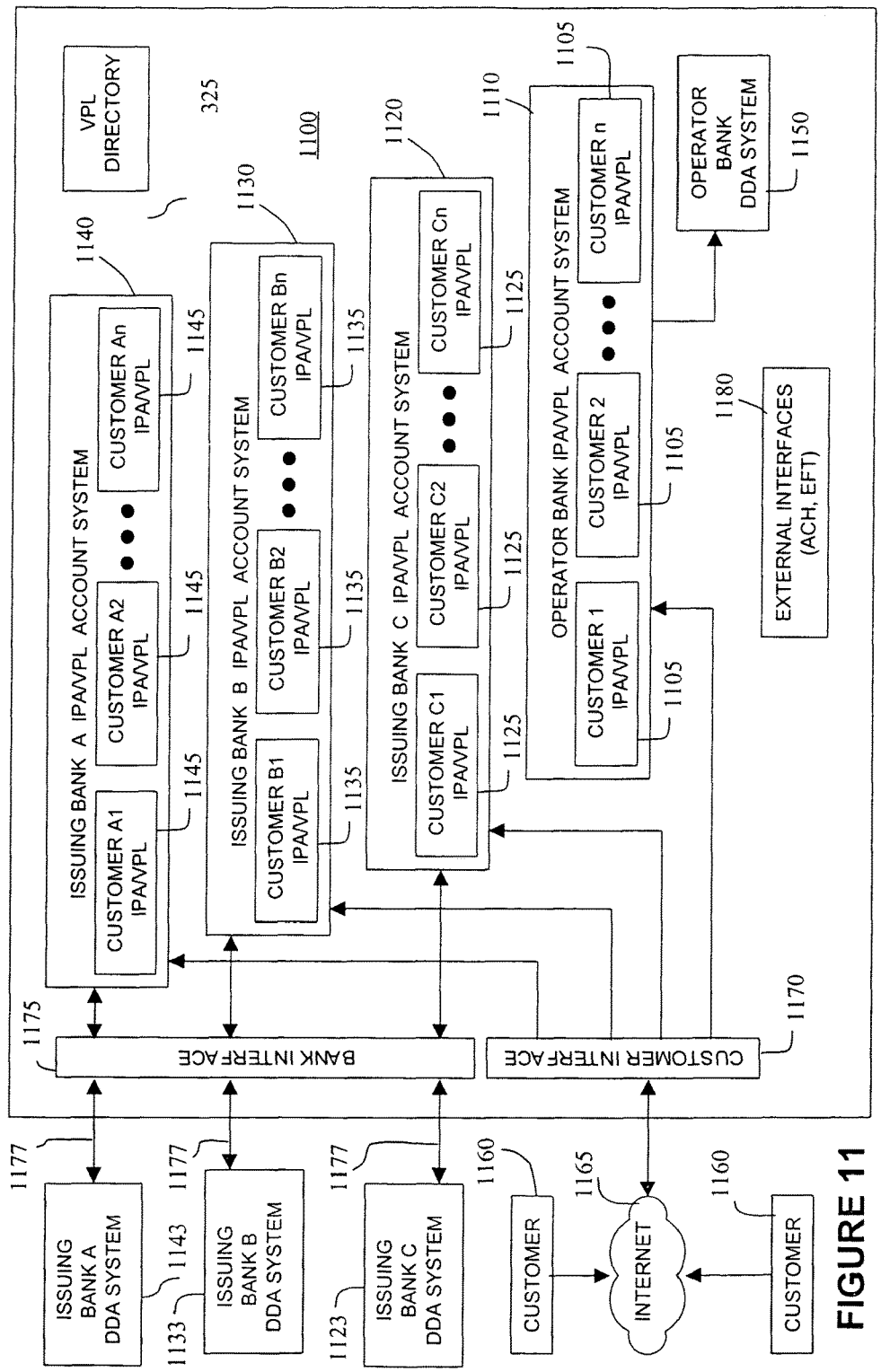
FIG. 11 depicts a private label embodiment of the present invention.

FIG. 11 illustrates a private label embodiment of the present invention. In the embodiment depicted in FIG. 11, the system is operated by an operator bank 1100 that maintains an IPA/VPL system 1110 for its customers. In the IPA/VPL system 1110, there exists an IPA/VPL account 1105 for each of its customers that have elected to establish an IPA/VPL account 1105. As previously described, in a preferred embodiment, each of the IPA/VPL accounts 1105 is actually a single account with different address to access the account for the different type of functions. The IPA functions, e.g. the customer sending money out of the account 1105, are accessed by a userid and password protected address, and the receive only VPL function of the account 1110 is accessed through another address that can be made available to the public. In the embodiment of online shopping previously described, the online merchant is a customer 1160 with at least a VPL account (e.g., 1105) and preferably has the additional functionality of the VPL reporter (240, FIG. 2) as described above.

In addition to maintaining the IPA/VPL system 1105 for its own customers, bank 1100 also maintains IPA/VPL systems 1120, 1130 and 1140 for bank C 1123, bank B 1133 and bank A 1143 respectively. This maintenance of IPA/VPL systems 1120, 1130 and 1140 is commonly referred to as private labeling. As is further described below, all external indications to the customers of banks A 1143, B 1133 and C 1123 are that the banks 1123, 1133 and 1143 are maintaining the IPA/VPL systems 1120, 1130 and 1140 themselves, when in reality, the IPA/VPL systems 1120, 1130 and 1140 are maintained by operator bank 1100 on behalf of banks 1123, 1133 and 1143. Although in this preferred embodiment, the operator of the system 1100 is described as being a bank, the system 1100 can be any party and the banking functions performed by operator bank 1100 for its customers are ancillary to the system and method of the present invention.

In a preferred embodiment, the sign up process is designed to enable a customer to create an active IPA/VPL account (e.g. account 1105) in a single session, electronically, without human intervention and without the need to transfer documentation between the user and the system. Users can preferably open three different types of accounts. The first is standard IPA/VPL account that has send and receive payment functionality. This account type can be set up for IPA funding and VPL withdrawals by sweeping to an existing bank account (e.g. a DDA account in the banks' DDA systems, 1150, 1143, 1133, 1123) and withdrawing funds through an ATM or debit card. A second type of account is a VPL only account for anonymous users that can only receive payments and can be used for ATM withdrawals. The third type of account is a VPL only account for an identified customer that receives payments and can be set up for VPL withdrawals by sweeping funds to an existing bank account and withdrawing of funds through an ATM/debit card.

In order to sign up, a customer (or potential customer) 1160 can log onto a web site of the operating bank 1100 through the Internet 1165. Customers 1160 can also sign using other mean such as telephone, branch visit or through the mail. In the private label environment, the customer 1160 might navigate to the bank 1110 website on the Internet 1165 though a web site of one of the other banks 1123, 1133 or 1143. In this case, depending on the manner in which the customer arrives at the web site, the site is branded for the bank 1100, 1123, 1133, 1143. For example, if customer 1160 is a customer of bank 1143 (e.g., already has a DDA account with bank 1143) and elects to sign up for the service on a website of bank 1143, when the customer is directed to the website of operating bank 100, it will appear to customer 1160 that he/she is still on the website of his/her own bank 1143. The same branding of the website maintained at operating bank 1110 will hold for all future visits by that customer 1160. The branding is accomplished as part of the web site programming contained in the customer interface 1170.

During the sign up process, the system at bank 1100 verifies the customer's identification, making certain that information such as customer address, name, or SSN# are accurate. Information provided by customer is matched against external databases (e.g., Electronic White Pages) or the bank's 1110 or issuing bank's 1123. 1133, 1143 customer information file (CIF). In order to authenticate a customer 1160 during subsequent sign ons, the system requests data that is considered to be confidential and known only by the user 1160. A two tiered approach to authentication is taken where the user 1160 is only required to provide SSN to sign up for an account but is required to provide additional data if they set up a funding source for the IPA/VPL account (e.g., 1105). The second tier of the authentication process includes challenge questions such as "last ATM transaction" or "mortgage principal." The challenge questions can be derived from a issuing bank's database (1123, 1133, 1143) or from an external database.

If the customer 1160 is a new customer signing up from an authenticated site at issuing bank 1123, 1133 or 1143, bank 1100 assumes that the customer 1160 has already been verified and authenticated by the issuing bank 1123, 1133 or 1143. In order to make the sign up process seamless and simple for these customers 1160, profile information is retrieved from the customer's online account or the customer information files (CIF) at the bank 1123, 1133 or 1143. If the customer 1160 does not have an account at the issuing bank 1123, 1133 or 1143, an external third party system (e.g., Equifax.com, Fast Data, Electronic White Pages) is used to review and verify the customer's application. If the customer 1160 is requesting an anonymous VPL account, and if the customer requests an ATM card, an address is required.

Once the customer 1160 has established an IPA/VPL account (e.g., 1105), the customer 1160 is able to conduct all of the transactions described above such as pay anyone, online shopping or bill payment. In addition to the pushing of payments on the EFT network as described above, the private label system operated by bank 1100 can act as a "closed" system. In the closed system, funds can be transferred between IPA/VPL accounts without using the EFT system. For example, if customer A1 wants to send customer C2 some cash, customer A1 instructs the system to debit his/her IPA/VPL account 1145 and credit the IPA/VPL account 1125 of customer C2. In this closed system environment, bank 1100 uses its internal systems to transfer the funds from customer A1's IPA/VPL account 1145 to the IPA/VPL account 1125 of customer C2. In the above example, no use of the EFT system is required. Of course, even though bank 1100 is capable of effectuating closed system transfers, it is also capable of executing external EFT transfers as described above using the bank's external interface 1180. For example if customer B1 wants to transfer funds to someone that has at least a VPL account at another bank (not shown), operator bank 1100 debits customer B1's IPA/VPL account 1135 and sends the funds to the destination VPL account using the external interface 1180 and the EFT system as described above. The external interface 1180 is additionally used to coupled the bank 1100 into the ACH network and credit card merchant network in the traditional manner know to those skilled in banking practices.

Two features of the present invention that are illustrated though FIG. 11 are an auto-fund and an auto-sweep feature. As described above, a customer 1160 can establish preferences as to how an IPA/VPL account (e.g. 1105) is to be funded. For example, the customer 1160 can instruct the system that the IPA/VPL account (e.g. 1105) is to funded from a specific credit card, debit card, DDA or savings account owned by the customer 1160. This funding of the IPA/VPL account (e.g. 1105) can be set to occur on a regular basis, such as daily, weekly or monthly. In an additional embodiment, the funding can occur in real time. For example, a customer 1160 might instruct the system to send a payment of $100 to his daughter's account. The first thing the system does is to check whether the customer's IPA/VPL account (e.g. 1105) has the $100 to cover the amount of the payment. If it does not, the customer 1160 has the opportunity to previously set a preference within the system in which he authorized the system to automatically transfer any deficient amount from, for example, his DDA account to the IPA/VPL account (e.g. 1105). If the customer 1160 only had $25 in his IPA/VPL account (e.g. 1105) at the time he requested the payment, the system would then transfer $75 from the customer's DDA account. The auto-funding feature of the present invention further allows the customer 1160 to indicate that if the IPA/VPL account (e.g. 1105) drops below a certain threshold balance, e.g., $100, that the account is automatically funded from the other account (e.g. credit card account) specified by the customer 1160.

If the customer 1160 has selected to fund the account from a DDA or savings account, the system first checks where the funding account is held. If the funding account is held at the operator bank 1100, the system merely transfers, internally, the funding amount from the DDA/savings account system 1150 to the IPA/VPL account (e.g. 1105). This procedure is straightforward, does not involve any other banks, and only requires an interface between the DDA system 1150 and the IPA/VPL account system (e.g. 1110). If the funding account is not held by the operator bank 1100, the operator bank must contact the bank at which the funding DDA or savings account is maintained.

As illustrated in FIG. 11, the operator bank 1100 contacts other issuing banks (e.g., 1123, 1133, 1143) through a bank interface 1175 and a communication link 1177 to the issuing bank. The communication link is preferably a private direct dial connection, virtual private network, a value added network or a secure Internet connection. Naturally, the most stringent requirement of the link 1177 is that it is a secure connection, as the communications between the banks (1123, 1133, 1143) and the operator bank 1100 involve the transfer of funds. The bank interface 1175 and the corresponding interface in each of the issuing banks (1123, 1133, 1143) (not shown) ensure that the connections are secure (e.g., proper encryption, authentication . . . ).

In conducting the transfer of funds to the IPA/VPL account (e.g. 1105) the operator bank 1100 sends the transfer request to the issuing bank (e.g., 1123, 1133, 1143) through interface 1175 and link 1177. The protocol of the transfer request and the confirmation of the transfer have previously been established between operator bank 1100 and the issuing banks (1123, 1133, 1143) and are coded into the bank interface 1175 and the interfaces in the respective issuing banks 1123, 1133 and 1143. Upon receiving the request for a transfer of funds, the issuing bank (e.g., 1123, 1133, 1143) verifies the available funds in the customer's account in its own DDA system. If there are sufficient funds available to cover the transfer, the issuing bank 1123, 1133, 1143 debits the customer's account and sends the operator bank 1100 a confirmation of the transfer of funds back over link 1177 and interface 1175. Settlement of the funds transferred according to this method occurs preferably at the end of the day between the operator bank and issuing banks 1123, 1133, 1143.

If there are insufficient funds in the customer's DDA or savings account, the issuing bank 1123, 1133, 1143 send a message back to the operator bank 1100 informing it of this situation. In a preferred embodiment, the operator bank informs the customer 1160 of the insufficient funds advice and allows the customer 1160 to specify a different account from which to fund the IPA/VPL account (e.g., 1105).

In a somewhat reverse situation, the customer 1160 can also designate an account to which funds are automatically swept after being received by the IPA/VPL account (e.g., 1105). As previously described, a customer 1160 can designate an account to which funds are transferred as well as a time when the transfer is to occur. In one embodiment of the present invention, the funds are automatically transferred to the designated account as soon as they are received in the IPA/VPL account (e.g., 1105). For example, customer A1, the owner of IPA/VPL account 1145 may specify that any funds received by her IPA/VPL account 1145 should immediately be swept to her checking account in her home bank 1143. As soon as funds a received into her account IPA/VPL account 1143 (e.g., funds from the IPA/VPL account 1125 of customer C2), operator bank 1100 formats a funds transfer message that is transmitted through bank interface 1175, over link 1177 to issuing bank 1143. Issuing bank 1143 then credits customer A1's DDA account within its DDA system. Again, actual settlement of the funds between operator bank 1110 and issuing bank 1143 typically occurs at the end of the day. In alternative embodiments, the automatic sweeping can occur if the balance in the IPA/VPL account 1143 exceeds a predefined threshold, or can be scheduled to occur on a periodic basis, e.g., daily, weekly or monthly.

Although the above has described the operation of a private label system by operator bank 1110, it is clear that customers A1-An, B1-Bn, C1-Cn of the issuing banks 1123, 1133 and 1143 and Customer 1, Customer 2, Customer n of operator bank 1100 can still transfer funds through the EFT system as described above using the EFT interface 1180.

Figure 12:
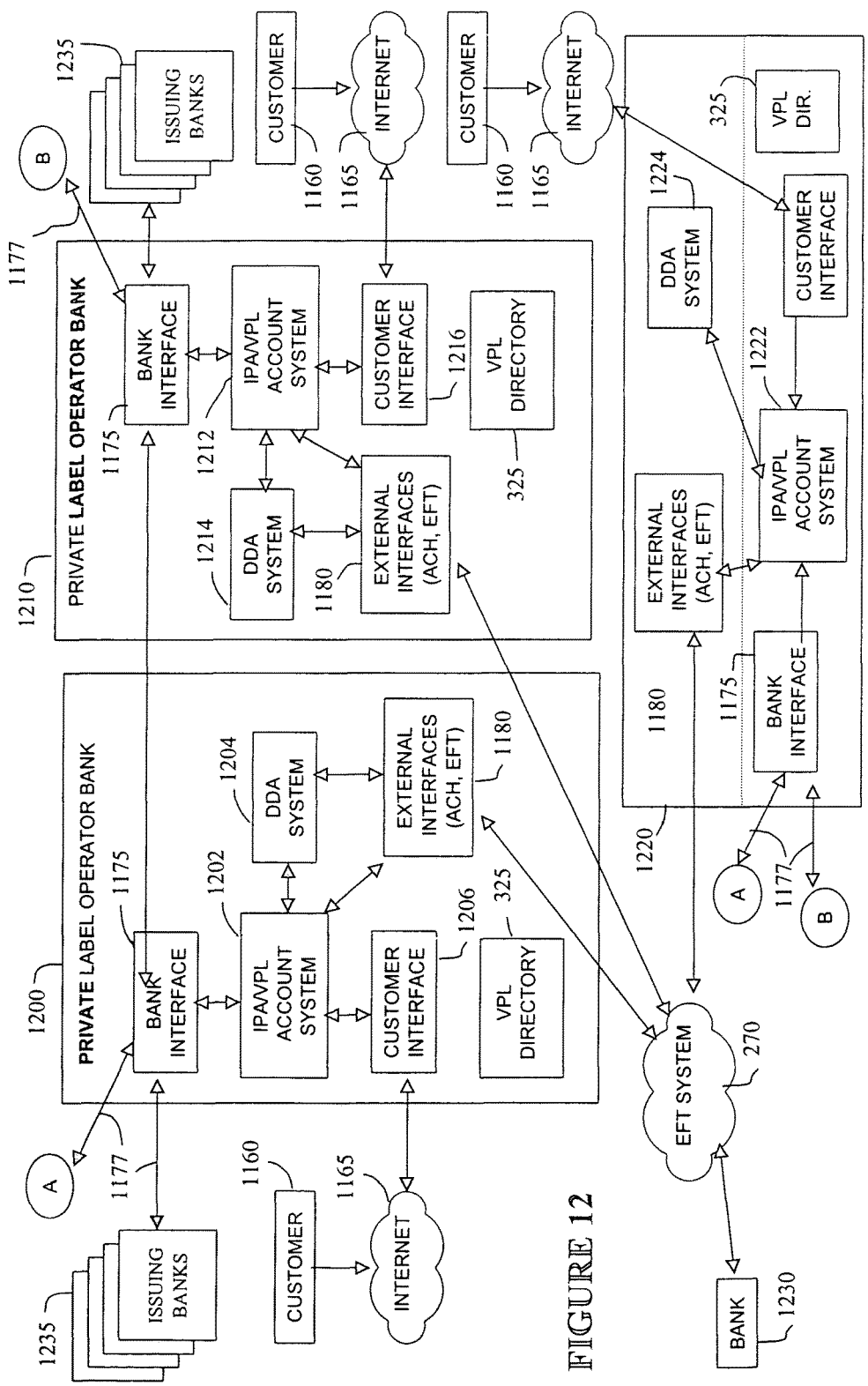
FIG. 12 show a plurality of banks operating according to the present invention.

FIG. 12 illustrates the interaction of several banks operating in accordance with the present invention. This illustration shows two different banks 1200 and 1210 that function as private label operators as described above with respect to FIG. 12, as well as a bank 1220 operating an IPA/VPL account system 1222 for its own customers, as well as a traditional bank 1230 that is connected to the EFT system 270.

Each of the private label banks 1200, 1210 operate an IPA/VPL account system 1202, 1212 for the benefit of their issuing banks 1235, 1236 as well as their own customers. In a preferred embodiment, the issuing banks 1235, 1236 are associated with only a single private label operator bank 1200 or 1210, but it is possible that there is some issuing banks could have IPA/VPL accounts at each of the private label operator banks 1200, 1210. Each of the private label operators includes the bank interface 1175 as described above for providing secure financial communications over links 1177 to the issuing banks 1235, 1236, to the other private label banks 1200, 1210, as well as to other banks 1220 that maintain IPA/VPL accounts. The links 1177 between private label bank 1200, private label bank 1210 and between IPA/VPL bank 1220 and the private label banks 1200, 1210 form a system that does not rely on the EFT network 270 to communicate funds transfers. In an alternative embodiment, each of the banks 1200, 1210, 1220 can communicate the funds transfers through the EFT system 270 as described above, without the need for the private links 1177. Similarly, the communication between either of the private label operator banks 1200, 1210 and its issuer banks 1235, 1236 can be accomplished through the EFT system 270. Although not specifically illustrated in FIG. 12, each of the issuer banks 1235, 1236 is also coupled to the EFT system 270.

Each of the private label operator banks 1200, 1210 operates its own IPA/VPL system 1202, 1212 respectively for the benefit of its own customers and the customers of the issuing banks 1235 and 1236 respectively. The IPA/VPL systems 1202, 1212 are respectively coupled to the internal DDA systems 1204, 1214 of the operator banks 1200, 1210.

The customer interfaces 1206, 1216 of each operator bank 1200, 1210 are customized such that when a particular customer logs onto the system, the interface seen by that customer is designed so the customer believes that he/she is dealing with his or her own bank 1235, 1236. As previously described, the customer profiles maintained by the operator banks 1200, 1210, allow for the recognition of the bank affiliation of the customer and accordingly the particular screen interface that should be presented to the customer.

It is readily appreciated that the system can accommodate a plurality of private label operator banks 1200, 1210 as well as a plurality of IPA/VPL banks 1220. In addition, the system allows for funds to be transferred to customers of banks 1230 that do not maintain IPA/VPL accounts. In this embodiment, the owner of a IPA/VPL account must know the number of the intended recipient's account at bank 1230. As this BIN number of a non IPA/VPL account is sensitive information, it is not envisioned that intended recipients would only give this account number to trusted individuals. With the account number in hand, the IPA/VPL account owner is able to instruct the system to transfer funds from his or her IPA/VPL account to the recipient's account. As described above, the funds are transferred via the EFT system 270 to bank 1230, which deposits the funds in the intended recipient's account. The only requirement of bank 1230 in receiving these funds is that it has the proper interface from the provider of the EFT interface to receive the real time credit of funds.

FIG. 12 illustrates a further feature of the present invention with respect to IPA/VPL bank 1220. The bank interface 1175, the IPA/VPL account system 1222, the customer interface 1216 and the VPL directory 325 each appear below the dotted line within in bank 1220. The significance of this configuration is that the elements 1175, 1222, 1216 and 325 are all bundled together as single module which is then plugged into the DDA system 1224 and the external interface system 1180 of bank 1220. No other modification or interfaces to the internal systems of bank 1220 are necessarily required for the bank 1220 to operate the IPA/VPL accounts and the functionality of this embodiment of the present invention. This bundling of components allows virtually any bank 1230 the ability to maintain IPA/VPL accounts for their own customers with virtually no change to their existing bock office systems and minor effort for integration.

Figure 13:
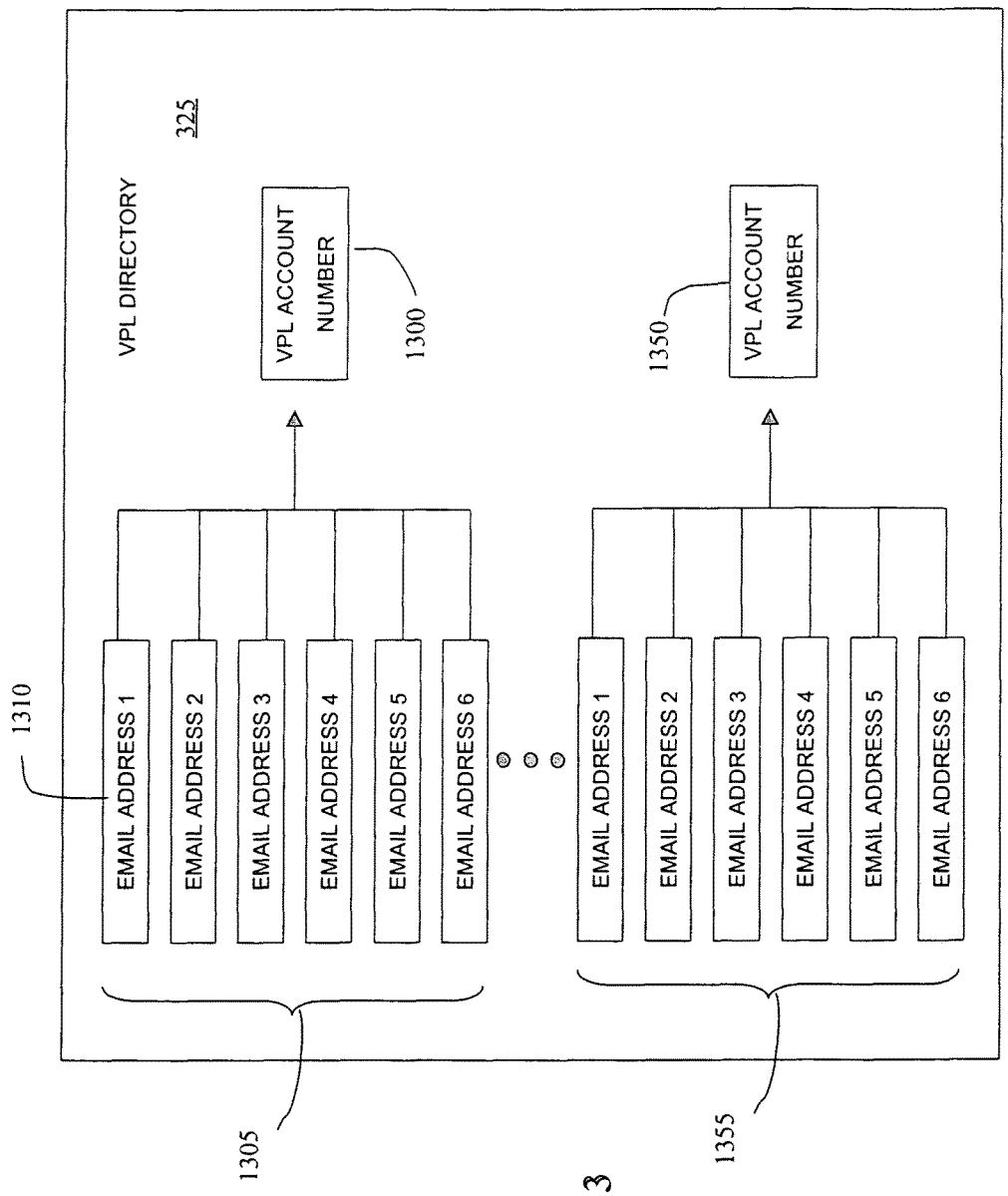
FIG. 13 illustrates a structure of the VPL directory employing email correspondences.

FIG. 13 depicts an embodiment of the VPL directory 325 for use in the system and method of the present invention. As previously described with respect to FIG. 3 and others, the VPL directory is a convenient table that can be used to look up or otherwise identify the VPL account identifiers (numbers) of each of the owners of VPL accounts. As previously described, in a preferred embodiment, the IPA and VPL accounts are in reality a single account with different addresses into the account to access the different functionality. For example, one address, the IPA address is used by the account owner to make outgoing transfers of funds from the account, while the other address, the VPL address, is a receive only channel into the account that can be publicly distributed without fear that an unauthorized user would be able to retrieve any funds through this VPL receive only address.

In this embodiment, the system associates a plurality of the account owner's email addresses 1305, 1355 with the VPL address 1300, 1350 of the IPA/VPL account. In this manner, a user, instead of have to remember or look up the intended recipient's VPL account number, can merely type in the user's email address. The system then consults the VPL directory 325 and retrieves the VPL address associate with that email address. For example, when prompted by the system for the destination of the payment from the user's IPA account, the user types in email address 1310 (e.g. john_q_public@chase.com). The system goes to the VPL directory 325, finds the email address 1310 (e.g. john_q_public@chase.com) and retrieves the actual VPL account number (address) 1300. FIG. 13 illustrates two such accounts 1300, 1350 and their associated email addresses 1305, 1355, but it is readily appreciated that this structure in VPL directory 325 can be duplicated for each VPL account number contained in the directory 325.

Figure 14:
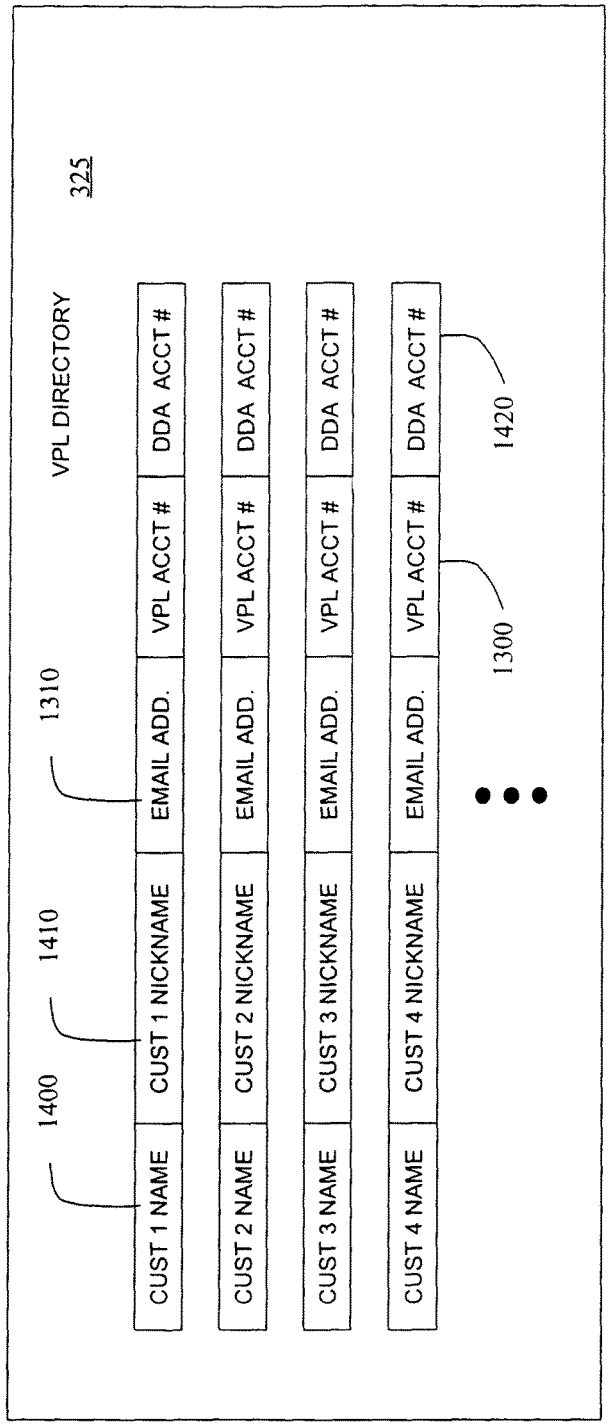
FIG. 14 illustrates and alternative embodiment of a VPL directory.

In a further embodiment as illustrated in FIG. 14, an owner of a VPL account 1300 can additionally choose to have his/her/its proper name 1400 associated with the VPL account in the VPL directory 325. Although individuals might not want to take advantage of this capability for reasons of privacy, businesses would most certainly want users of the VPL directory 325 to be able to search for the business by its name 1400. For example, in addition to its email address(es) 1310 (only one shown in FIG. 14), a business would also includes it name 1400 and variants thereof 1410 included as entries that are associated with its VPL account 1300. For example, Jerry Smith's Gardening Service would be able to include an entry 1400 that associates the name "Jerry Smith's Gardening Service" with the business' VPL account 1300.

The customer nickname field 1410 can be populated by virtually any identifier that can be used to as an alias to identify the owner and therefore, by the association of directory 325, the VPL account 1300 of any customer. For example, the customer might want to include its screen name or other popular nickname in field 1410. The customer may also want to populate field 1410 with its cell phone number. In this manner if someone has the customer's cell phone number, they can address the customer's VPL account 1300 by referencing the directory 325.

Referring back to FIG. 12 for the moment, a VPL directory 325 has been illustrated as being part of the system in each bank 1200, 1210 and 1220. In order for a customer to be able to reach all other customers that have IPA/VPL accounts, regardless of the bank at which the customer maintains his/her account, the VPL directories 325 in each bank must be synchronized. That is to say, as a bank adds new customers with new accounts, or a customer adds new email addresses to be associated with the account, this information must be communicated to the other banks in the system. In one embodiment of the present invention, there is a centralized Lightweight Directory Access Protocol (LDAP) directory (see FIG. 3) which is synchronized across all bank installations. In one embodiment of the synchronization scheme, each bank 1200, 1210, 1220 own their part of the directory 325 from an updating standpoint, while the other banks have read only access to that segment of the directory 325.

Returning to FIG. 13, it is preferable that within directory 325 each VPL account 1300 has data from at least one other field (1400, 1410 . . . ) associated therewith. Again, as described above, it is also preferable that these directories 325 are synchronized across the systems (e.g., banks 1200, 1210 . . . (FIG. 12)). It is also preferable that each customer is able to maintain its own directory 325 (or portions thereof) that are private to the customer. For example, a customer might have nicknames for a plurality of other customers that need not be shared with the remainder of the world. These private nicknames can be used to populate field 1410 as described above. Although only one field 1410, or 1310, is shown for each record, it is readily appreciated that multiple fields (e.g. nickname 1410) can be included in each record. During the synchronization process described above, the system is able to distinguish between private fields that need not be synchronized and other fields (e.g., a nickname added by the customer itself that it wants published) that are required to be distributed to each directory 325 in the system.

In one embodiment, the system accomplishes this by constructing files that contain the customer's personalized information. For example, in a preferred user interface to the system (not shown), the user is able to establish a list of frequent payees. Similar to the structure shown with respect to the VPL directory 325 illustrated in FIGS. 13 and 14, a look-up table is constructed for the user which associates various user provided information to a particular VPL account 1300. For example, a user might want to call up a person's name 1400 or nickname 1410 as described above, rather than having to remember the person's VPL account number or even the person's email address. Using this feature, a user is thus able to quickly retrieve the payee's VPL account number 1300 by making reference to whatever identifying information the user previously provided (e.g., the person's name).

FIG. 14 illustrates a further significant feature of the present invention. Although it is preferable that the VPL account number 1300 be published and accessible from the VPL directory 325, this is not required. The system has the capability of hiding certain fields from being accessed by the public. This is most clearly evident with the DDA account number field 1420. Rather than having a VPL account 1300, certain people will choose not to ever establish a VPL account 1300 and would rather have other's push payments directly to their DDA or Savings account 1420. For example, as described above with respect to the pay anyone (FIGS. 3 and 5) a user is able to key in the payee's account number in order to push a payment to that payee's account.

In an alternative embodiment, the user is able to key in some other identifying information with respect to the payee (e.g., payee's name 1400) and the system will retrieve the payee's VPL account number 1300 or DDA/Savings account number 1420 from the VPL directory 325. In this manner a payee does not have to establish a VPL account 1300, nor does it have to provide a payor with its confidential DDA account information 1420. This information (e.g., 1420) can be hidden from the payor by the system.

Although FIG. 14 illustrates that the payee's information resides in the VPL directory 325, this is not required. For example, in connection with the Online Shopping embodiment of the present invention as described above in connection with FIG. 2, a particular Internet merchant might not be a subscriber to the system (i.e., the merchant has established a VPL account). In this embodiment, a payor is still able to push a credit to the payee's DDA account as long as the system has a mechanism for obtaining the payee's DDA account number (and associated bank routing information as described above). The system can obtain this information in a variety of means. As previously described, the DDA account information for this particular payee might have been pushed a payment by the system and its account information has been stored in the VPL directory 325, but is hidden from all payors. Alternatively, the payee's account information can be communicated to payee's bank in real time when an online purchase is being conducted. In one embodiment, the payee can directly communicate this account information directly to the payor's bank without the payor having any access to the payee's account information.

Alternatively, the payee's account information can be securely communicated to the payor's bank through the online session between the payor and the payee. For example, the payee's account information can be encrypted, communicated to the payor, who communicates the encrypted account information to its bank that decrypts the account information and is able to push a payment to the payee's account. In this manner, the payee is able to protect its confidential account information and yet is able to receive credit pushes from any payee over the EFT network in accordance with the principles of the present invention.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A system for effectuating electronic payments using a credit transfer via an Electronic Funds Transfer (EFT) network, the system comprising:

at least one account system operated by a first institution and tangibly embodied in a processing system, the at least one account system maintaining a plurality of electronic payment accounts for a plurality of customers of a first bank, at least one of the plurality of customers having a demand deposit account at the first bank;

a bank interface coupled to the at least one account system and coupled to the first bank, the bank interface tangibly embodied in the processing system, the bank interface transmitting and receiving financial information related to the demand deposit account of the at least one customer and related to the electronic payment account of the at least one customer, the at least one account system funding the electronic payment account of the at least one customer from the demand deposit account of the at least one customer; and a customer interface coupled to the at least one account system, the customer interface providing an interface for the plurality of customers to the at least one account system, the customer interface:

establishing an interface with a first customer including a log-in to establish interface with the first customer, the interface with the first customer utilizing encryption to provide protection to the interface with the first customer;

accepting a command from the first customer to transfer funds from the first customer's electronic payment account to an electronic payment account of another customer, the command including account information identifying the first customer's electronic payment account; and transferring the command to the at least one account system; and the at least one account system effectuating the commanded transfer of funds through the EFT network, such effectuating of the commanded transfer of funds including transmission of an EFT credit message representing a credit in an amount of the electronic payment, the transmitting of the EFT credit message constituting a pushing of funds to the electronic payment account of the another customer, the electronic payment account of the another customer being a virtual private locker (VPL) which is a receive-only account, the account number of which is known to the first customer, a payor of the funds, the customer interface transferring the command to the at least one account system, which effectuates the commanded transfer of funds, includes the account system:
receiving the command; and
receiving the account information identifying the first customer's electronic payment account; and
sending, through the EFT network, a verification message to the electronic payment account of the another customer to verify the VPL's existence and identity;
receiving from the VPL a response message that includes a description of an owner of the VPL;
interfacing with the first customer to input a selection from the first customer regarding whether the another customer is to be provided with information such that the first customer's electronic payment account is identifiable to the another customer, and inputting selection from the first customer that the another customer is not to be provided with information such that the first customer's electronic payment account is identifiable to the another customer;
wherein in such pushing, a payee account number of the another customer, the payee, is transmitted over a network without the account information of the first customer, the payor; and
wherein the pushing of funds, without the account information of the first customer, is constituted by the payee not being provided with information such that the payor account is identifiable to the payee.

2. The system as recited in claim 1, wherein the at least one account system automatically funds the at least one customer's electronic payment account.

3. The system as recited in claim 2, wherein the at least one account system automatically funds the at least one customer's electronic payment account by withdrawing funds from the at least one customer's demand deposit account at the first bank.

4. The system as recited in claim 3, wherein the withdrawal of funds from the at least one customer's demand deposit account at the first bank occurs in real time.

5. The system as recited in claim 3, wherein a balance of the at least one customer's electronic payment account triggers the automatic funding.

6. The system as recited in claim 5, wherein if the balance falls below a threshold balance the automatic funding is triggered.

7. The system as recited in claim 2, wherein the at least one account system automatically funds the at least one customer's electronic payment account from a credit card account of the at least one customer.

8. The system as recited in claim 2, wherein the at least one account system automatically funds a second customer's electronic payment account by requesting funds from a demand deposit account of the second customer at a bank different from the first bank.

9. The system as recited in claim 8, further comprising an interface to the Automated Clearing House (ACH) system, wherein the request for funds from the bank different from the first bank is transmitted through the ACH system.

10. The system as recited in claim 1, wherein the at least one account system automatically sweeps funds in the at least one customer's electronic payment account into the at least one customer's demand deposit account at the first bank.

11. The system as recited in claim 10, wherein the at least one account system automatically sweeps funds as soon as they are received in the at least one customer's electronic payment account.

12. The system as recited in claim 10, wherein the at least one account system automatically sweeps funds on a periodic basis.

13. The system as recited in claim 12, wherein the periodic basis is selected from the group of daily, weekly and monthly.

14. The system as recited in claim 10, wherein the at least one account system automatically sweeps funds if a balance in the at least one customer's electronic payment account exceeds a threshold.

15. The system as recited in claim 1, wherein the customer interface is branded such that it appears that the first bank is operating the system.

16. The system as recited in claim 1, further comprising a secure connection coupling the bank interface and the first bank.

17. The system as recited in claim 16, wherein the secure connection is a private network.

18. The system as recited in claim 16, wherein the secure connection is a direct dial connection.

19. The system as recited in claim 1, wherein the first institution is a second bank.

20. The system as recited in claim 19, further comprising: a second account system operated by the second bank, the second account system maintaining a second plurality of electronic payment accounts for a second plurality of customers; and a demand deposit account system coupled to the second account system, the demand deposit account system maintaining a demand deposit account for at least one of the second plurality of customers.

21. The system as recited in claim 20, wherein the second account system is coupled to the customer interface, the customer interface providing an interface for the second plurality of customers to the second account system, the customer interface accepting a command from any of the second plurality of second customers to transfer funds from a source electronic payment account in the second account system to a destination electronic payment account in either the at least one account system or the second account system, the customer interface transferring the command to the second account system which effectuates the commanded transfer of funds.

22. The system as recited in claim 21, wherein the customer interface is configured such that when any of the plurality of customers of the first bank access the at least one account system it appears that the first bank is operating the system, and wherein the customer interface is further configured such that when any of the second plurality of customers of the second bank access the second account system it appears that the second bank is operating the system.

23. The system as recited in claim 1, further comprising: a plurality of additional account systems operated by the first institution, each of the plurality of additional account systems corresponding to a respective one of a plurality of additional banks, the plurality of additional account systems maintaining a second plurality of electronic payment accounts for respective customers of the plurality of additional banks.

24. The system as recited in claim 23, wherein each of the plurality of additional account systems are coupled to the bank interface, the bank interface providing a secure interface between demand deposit account systems at the respective plurality of additional banks and the plurality of additional account systems.

25. The system as recited in claim 23, wherein the customer interface is configured such that when any of the customers of the plurality of additional banks access their respective account system it appears that the customer's respective additional bank is operating the system.

26. The system as recited in claim 1, further comprising an interface to the Electronic Funds Transfer (EFT) network, wherein the financial information related to the demand deposit account of the at least one customer and related to the electronic payment account of the at least one customer is transferred over the EFT network.

27. The system as recited in claim 26, wherein the financial information is the transfer of funds.

28. The system as recited in claim 26, wherein the EFT network is an Automated Teller Machine (ATM) network.

29. The system as recited in claim 26, wherein the EFT network is a network available for use by owners of demand deposit accounts.

30. The system as recited in claim 1, further comprising a customer directory, the customer directory containing an identification of each of the plurality of customers and a correspondence between the identifications and the electronic payment accounts of the plurality of customers.

31. The system as recited in claim 30, wherein there are a plurality of identifications for each of the plurality of customers, and wherein the identifications include at least one email address for at least one of the customers.

32. The system as recited in claim 30, wherein there are a plurality of identifications for each of the plurality of customers, and wherein the identifications include at least one nickname for at least one of the customers.

33. The system as recited in claim 30, wherein there are a plurality of identifications for each of the plurality of customers, and wherein the identifications include a cell phone number for at least one of the customers.

34. The system as recited in claim 1, wherein the customer interface comprises: a payment request module, the payment request module accepting a request for payment from a second customer, the payment request module communicating the request for payment to a third customer.

35. The system as recited in claim 34, further comprising: an email facility coupled to the customer interface, wherein the request for payment is communicated to the third customer through the email facility.

36. The system as recited in claim 35, wherein the request for payment relates to a potential payor that does not have an electronic payment account, and wherein the request for payment is communicated to the potential payor through the email facility.

37. The system as recited in claim 36, wherein the request for payment comprises a link to the system, whereby the potential payor can satisfy the request for payment through the system.

38. The system as recited in claim 37, wherein the potential payor satisfies the request for payment by establishing an electronic payment account and making the requested payment from the electronic payment account.

39. The system as recited in claim 1, further comprising an email facility operable with the customer interface, wherein a customer desires to make a payment to a potential payee, the potential payee not having an electronic payment account, the email facility communicating the potential payment to the potential payee.

40. The system as recited in claim 39, wherein the potential payment communicated by the email facility comprises a link to the system, whereby the potential payee can retrieve the potential payment through the system.

41. The system as recited in claim 40, wherein an electronic payment account is established for the benefit of the potential payee and wherein the potential payment is communicated from the customer's electronic payment account to the electronic payment account established on behalf of the potential payee.

42. The system as recited in claim 1, wherein a customer desires to make a payment to a potential payee, the potential payee not having an electronic payment account, the system further comprising: a potential payee electronic payment account established for the benefit of the potential payee, wherein the potential payment is communicated to the potential payee electronic payment account; and a physical card linked to the potential payee electronic payment account, wherein the physical card is sent to the potential payee.

43. A system for effectuating electronic payments using a credit transfer via an Electronic Funds Transfer (EFT) network, the system comprising:

an electronic payment account system operated for the benefit of a bank and tangibly embodied in a processing system, the account system maintaining a plurality of electronic payment accounts for a plurality of customers of the bank;

a bank interface coupled to the electronic payment account system and coupled to a demand deposit account system of the bank, the bank interface tangibly embodied in the processing system, at least one of the plurality of customers having a demand deposit account maintained in the demand deposit account system, the bank interface transmitting and receiving financial information related to the demand deposit account of the at least one customer and related to the electronic payment account of the at least one customer, the at least one account system funding the electronic payment account of the at least one customer from the demand deposit account of the at least one customer; and a customer interface coupled to the account system, the customer interface providing an interface for the plurality of customers to the account system, the customer interface accepting a command from a first customer to transfer funds from the first customer's electronic payment account to an electronic payment account of another customer through the EFT network by transmission of an EFT credit message representing a credit in an amount of the electronic payment, the transmitting of the EFT credit message constituting a pushing of funds to the electronic payment account of the another customer, the electronic payment account of the another customer being a virtual private locker which is a receive-only account, the account number of which is known to the first customer, the command including account information identifying the first customer's electronic payment account, and the customer interface transferring the command to the at least one account system which effectuates the commanded transfer of funds, such effectuating of the commanded transfer of funds including a pushing of funds directly from the first customer's electronic payment account to the electronic payment account of the another customer, and wherein the customer interface transferring the command to the at least one account system which effectuates the commanded transfer of funds includes the account system:

receiving the command;

receiving the account information identifying the first customer's electronic payment account;

sending, through the EFT network, a verification message to the electronic payment account of the another customer to verify the VPL's existence and identity; and receiving from the VPL a response message that includes a description of an owner of the VPL;

wherein in such pushing, address information associated with a payee account number of the another customer, the payee, is transmitted over a network without the account information of the first customer, the payor; and where the pushing of funds, without the account information of the first customer, is constituted by the payee not being provided with information such that the payor account is identifiable to the payee.

44. The system as recited in claim 43, further comprising an interface to the Electronic Funds Transfer (EFT) network, wherein the financial information related to the demand deposit account of the at least one customer and related to the electronic payment account of the at least one customer is transferred over the EFT network.

45. The system as recited in claim 44, wherein the financial information is the transfer of funds.

46. The system as recited in claim 44, wherein the EFT network is an Automated Teller Machine (ATM) network.

47. The system as recited in claim 44, wherein the EFT network is an Automated Clearing House (ACH) network.

48. The system as recited in claim 43, further comprising a customer directory, the customer directory containing an identification of each of the plurality of customers and a correspondence between the identifications and the electronic payment accounts of the plurality of customers.

49. The system as recited in claim 48, wherein there are a plurality of identifications for each of the plurality of customers, and wherein the identifications include at least one email address for at least one of the customers.

50. The system as recited in claim 48, wherein there are a plurality of identifications for each of the plurality of customers, and wherein the identifications include at least one nickname for at least one of the customers.

51. The system as recited in claim 48, wherein there are a plurality of identifications for each of the plurality of customers, and wherein the identifications include a cell phone number for at least one of the customers.

52. The system as recited in claim 43, wherein the customer interface comprises: a payment request module, the payment request module accepting a request for payment from a second customer, the payment request module communicating the request for payment to a third customer.

53. The system as recited in claim 52, further comprising: an email facility coupled to the customer interface, wherein the request for payment is communicated to the third customer through the email facility.

54. The system as recited in claim 53, wherein the request for payment relates to a potential payor that does not have an electronic payment account, and wherein the request for payment is communicated to the potential payor through the email facility.

55. The system as recited in claim 54, wherein the request for payment comprises a link to the system, whereby the potential payor can satisfy the request for payment through the system.

56. The system as recited in claim 55, wherein the potential payor satisfies the request for payment by establishing an electronic payment account and making the requested payment from the electronic payment account.

57. The system as recited in claim 43, further comprising an email facility operable with the customer interface, wherein a customer desires to make a payment to a potential payee, the potential payee not having an electronic payment account, the email facility communicating the potential payment to the potential payee.

58. The system as recited in claim 57, wherein the potential payment communicated by the email facility comprises a link to the system, whereby the potential payee can retrieve the potential payment through the system.

59. The system as recited in claim 58, wherein an electronic payment account is established for the benefit of the potential payee and wherein the potential payment is communicated from the customer's electronic payment account to the electronic payment account established on behalf of the potential payee.

60. The system as recited in claim 43, wherein a customer desires to make a payment to a potential payee, the potential payee not having an electronic payment account, the system further comprising: a potential payee electronic payment account established for the benefit of the potential payee, wherein the potential payment is communicated to the potential payee electronic payment account; and a physical card linked to the potential payee electronic payment account, wherein the physical card is sent to the potential payee.

61. A system for effectuating an electronic payment between a payor and a payee using a credit transfer to the payee via an Electronic Funds Transfer (EFT) network, the payor having a payor account at a payor institution and the payee having a payee account at a payee institution, the payee account being a virtual private locker which is a receive-only account, the account number of which is known to the payor, the system comprising:

a payee directory, the payee directory containing at least one identification of the payee and a correspondence between the at least one identification and the payee account at the payee institution;

a first software component coupled to the payee directory and tangibly embodied in a processing system, the first software component accepting the at least one identification and an amount of the payment from the payor, the first software component generating a payment instruction identifying the payee institution, the payee account and an amount of the payment, the first software component further communicating the payment authorization to the payor institution after (i) sending, through the EFT network, a verification message to the payee account of the payee to verify the VPL's existence and identity and (ii) receiving from the VPL a response message that includes a description of an owner of the VPL; and the first software component interfacing with the payor to input a selection from the payor regarding whether the payee is to be provided with information such that the payor account is identifiable to the payee, and inputting selection from the payor that the payee is not to be provided with information such that the payor account is identifiable to the payee;

a second software component at the payor institution coupled to the first software component and coupled to the EFT network, the second software component tangibly embodied in the processing system, the second software component receiving the payment instruction and transmitting from the payor institution to the payee institution through the EFT network an EFT credit message representing a credit in the amount of the payment, the transmitting of the EFT credit message constituting a pushing of funds from the payor to the payee, wherein in such pushing a payee account number of the another customer, the payee, is transmitted over a network without account information of the first customer, the payor; and wherein the account information includes at least one selected from the group consisting of: account number, pin number, credit card number, bank name, financial merchant and expiration date of account; and wherein the pushing of funds, without account information of the first customer, is constituted by the payee not being provided with information such that the payor account is identifiable to the payee.

62. The system as recited in claim 61, wherein the at least one identification is an email address for the payee.

63. The system as recited in claim 61, wherein the at least one identification is a nickname for the payee.

64. The system as recited in claim 61, wherein the at least one identification is a cell phone number for the payee.

65. The system as recited in claim 61, further comprising: a third software component at the payee institution coupled to the EFT network, the third software component receiving the EFT credit message and crediting the payee account in the amount of the payment.

66. The system as recited in claim 61, wherein the first software component comprises: a payment request module, the payment request module accepting a request for payment from a second payor, the payment request module communicating the request for payment to a second payee.

67. The system as recited in claim 66, further comprising: an email facility operable with the first software component, wherein the request for payment is communicated to the second payee through the email facility.

68. The system as recited in claim 66, wherein the request for payment relates to a potential payor that does not have an electronic payment account, and wherein the request for payment is communicated to the potential payor through the email facility.

69. The system as recited in claim 68, wherein the request for payment comprises a link to the system, whereby the potential payor can satisfy the request for payment through the system.

70. The system as recited in claim 69, wherein the potential payor satisfies the request for payment by establishing an electronic payment account and making the requested payment from the electronic payment account.

71. The system as recited in claim 61, further comprising an email facility operable with the first software component, wherein a payor desires to make a payment to a potential payee, the potential payee not having an electronic payment account, the email facility communicating the potential payment to the potential payee.

72. The system as recited in claim 71, wherein the potential payment communicated by the email facility comprises a link to the system, whereby the potential payee can retrieve the potential payment through the system.

73. The system as recited in claim 72, wherein an electronic payment account is established for the benefit of the potential payee and wherein the potential payment is communicated from the payor's electronic payment account to the electronic payment account established on behalf of the potential payee.

74. The system as recited in claim 61, wherein a payor desires to make a payment to a potential payee, the potential payee not having an electronic payment account, the system further comprising: a potential payee electronic payment account established for the benefit of the potential payee, wherein the potential payment is communicated to the potential payee electronic payment account; and a physical card linked to the potential payee electronic payment account, wherein the physical card is sent to the potential payee.

75. A system for effectuating an electronic payment between a payor and a payee using credit transfer via an Electronic Funds Transfer (EFT) network, the payor having a payor electronic payment account at a payor institution and the payee having a payee electronic payment account at a payee institution, the payee further having a virtual private locker (VPL) account at the payee institution, the virtual private locker account being a receive-only account, the account number of which is known to the payor, the system comprising:

a first processor generating a payment identification identifying the payee institution, the first processor tangibly embodied in a processing system, the payee electronic payment account and an amount of the payment, the first processor further communicating the payment identification to the payor institution; and the first processor interfacing with the payor to input a selection from the payor regarding whether the payee is to be provided with information such that the payor electronic payment account is identifiable to the payee, and inputting selection from the payor that the payee is not to be provided with information such that the payor electronic payment account is identifiable to the payee;

the first processor further sending, through the EFT network, a verification message to the payee electronic payment account to verify the VPL's existence and identity, and receiving from the VPL a response message that includes a description of an owner of the VPL;

a second processor at the payor institution coupled to the first processor and coupled to the EFT network, the second processor tangibly embodied in the processing system, the second processor receiving the payment identification and communicating from the payor institution to the payee institution through the EFT network an EFT credit message representing a credit in the amount of the payment, the communicating of the EFT credit message constituting a pushing of funds from the payor to the payee, wherein in such pushing a payee account number of the payee's virtual private locker account is transmitted over a network to identify the account to which the funds are pushed without account information of the payor, the EFT credit message including identification information that includes the information in the credit message that is unique to the payor, the identification information consisting essentially of a transaction ID (identification), the transaction ID being an identification that is provided to the payor at the time of a transaction to which the electronic payment is associated; and wherein the account information includes at least one selected from the group consisting of: account number, pin number, credit card number, bank name, financial merchant and expiration date of account.

76. The system as recited in claim 75, further comprising a third processor at the payee institution coupled to the EFT network, the third processor receiving the EFT credit message and crediting the payee electronic payment account in the amount of the payment.

77. The system as recited in claim 75, wherein the payee institution is the payor institution.

78. The system as recited in claim 75, wherein the payor and payee electronic payment accounts are demand deposit accounts.

79. The system as recited in claim 75, further comprising: a payment request module operating on the first processor, the payment request module accepting a request for payment from the payee, the payment request module communicating the request for payment to the payor.

80. The system as recited in claim 79, further comprising: an email facility coupled to the payment request module, wherein the request for payment is communicated to the payor through the email facility.

81. The system as recited in claim 80, wherein the request for payment relates to a potential payor that does not have an electronic payment account, and wherein the request for payment is communicated to the potential payor through the email facility.

82. The system as recited in claim 81, wherein the request for payment comprises a link to the system, whereby the potential payor can satisfy the request for payment through the system.

83. The system as recited in claim 82, wherein the potential payor satisfies the request for payment by establishing an electronic payment account and making the requested payment from the electronic payment account.

84. The system as recited in claim 75, further comprising an email facility operable with the first processor, wherein the payor desires to make a payment to a potential payee, the potential payee not having an electronic payment account, the email facility communicating the potential payment to the potential payee.

85. The system as recited in claim 84, wherein the potential payment communicated by the email facility comprises a link to the system, whereby the potential payee can retrieve the potential payment through the system.

86. The system as recited in claim 85, wherein an electronic payment account is established for the benefit of the potential payee and wherein the potential payment is communicated from the payor electronic payment account to the electronic payment account established on behalf of the potential payee.

87. The system as recited in claim 75, wherein the payor desires to make a payment to a potential payee, the potential payee not having an electronic payment account, the system further comprising: a potential payee electronic payment account established for the benefit of the potential payee, wherein the potential payment is communicated to the potential payee electronic payment account; and a physical card linked to the potential payee electronic payment account, wherein the physical card is sent to the potential payee.

88. The system as recited in claim 1, wherein the command from a first customer to transfer funds from the first customer's electronic payment account to an electronic payment account of another customer includes a payee account number of the payee.

89. The system as recited in claim 1, the customer interface accepting the command from a first customer to transfer funds being performed by interfacing with a personal device of the customer.

90. The system as recited in claim 89, the personal device of the customer being a cell phone.

91. The system as recited in claim 89, the personal device of the customer being a personal digital assistant (PDA).

92. The system as recited in claim 1, wherein the customer interface is further configured to display, to the first customer, the response message from the VPL so that the first customer can verify that the VPL is owned or used by the another customer.

* * * * *